(12) United States Patent
Nakayama et al.

(10) Patent No.: US 8,538,567 B2
(45) Date of Patent: Sep. 17, 2013

(54) AUDIO SIGNAL PROCESSOR AND AUDIO SIGNAL PROCESSING SYSTEM

(75) Inventors: Kei Nakayama, Hamamatsu (JP); Yuki Furumoto, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 303 days.

(21) Appl. No.: 13/048,815

(22) Filed: Mar. 15, 2011

(65) Prior Publication Data
US 2011/0230989 A1 Sep. 22, 2011

(30) Foreign Application Priority Data
Mar. 16, 2010 (JP) ................................. 2010-059464

(51) Int. Cl.
*H04L 12/00* (2006.01)
(52) U.S. Cl.
USPC .............. 700/94; 370/402; 370/405; 370/403
(58) Field of Classification Search
None
See application file for complete search history.

(56) References Cited

U.S. PATENT DOCUMENTS

| | | | | |
|---|---|---|---|---|
| 2003/0172257 | A1* | 9/2003 | Greenblat et al. | 712/234 |
| 2005/0036500 | A1* | 2/2005 | Rodeheffer et al. | 370/401 |
| 2005/0176377 | A1* | 8/2005 | Shoji et al. | 455/68 |
| 2007/0223498 | A1* | 9/2007 | Nakayama et al. | 370/400 |
| 2007/0230494 | A1* | 10/2007 | Nakayama | 370/412 |
| 2009/0225779 | A1* | 9/2009 | Diab et al. | 370/469 |

\* cited by examiner

*Primary Examiner* — Curtis Kuntz
*Assistant Examiner* — Thomas Maung
(74) *Attorney, Agent, or Firm* — Morrison & Foerster LLP

(57) ABSTRACT

Even when a system is made to have a configuration in which a plurality of transmission paths are connected to each other, a transmission-impossible time in each transmission path caused by changing a clock source to a device of a different transmission path can be shortened. In an audio signal processing system including first and second networks connected to each other through a bridge device, the bridge device operates as a slave in the first network and as a master in the second network. When the second network is reset, the bridge device starts to operate as a slave in the second network. Then, when continuous reception of an audio transmission frame that another device operating as a master in the second network has transmitted is started, the bridge device resets the first network and starts to operate as a master in the first network.

7 Claims, 18 Drawing Sheets

VIEW SHOWING SCHEMATIC CONFIGURATION OF AUDIO NETWORK SYSTEM

CB ··· COMMUNICATION CABLE

VIEW SHOWING SCHEMATIC CONFIGURATION OF AUDIO NETWORK SYSTEM

CB ··· COMMUNICATION CABLE

VIEW SHOWING SCHEMATIC CONFIGURATION OF PARTIAL NETWORK

CASCADE

LOOP

AR1,AR2,BR1,BR2,CR1,CR2··· SIGNAL RECEIVING I/F
AT1,AT2,BT1,BT2,CT1,CT2··· SIGNAL TRANSMITTING I/F
P··· PARTIAL NETWORK, CB···COMMUNICATION CABLE

VIEW SHOWING DATA CONFIGURATION OF TL FRAME

VIEW SHOWING TRANSMISSION TIMING OF TL FRAME

VIEW SHOWING TRANSMISSION SITUATION OF TL FRAME ON PARTIAL NETWORK

EXAMPLE OF WORD CLOCK SUPPLY STATE IN DEVICE
(CASE WHERE AUDIO SIGNAL PROCESSOR IS WORD CLOCK SOURCE OF ENTIRE SYSTEM)

EXAMPLE OF WORD CLOCK SUPPLY STATE IN DEVICE
(CASE WHERE AUDIO SIGNAL PROCESSOR IS NOT WORD CLOCK SOURCE OF ENTIRE SYSTEM)

OPERATION MODE CHANGE PROCESSING

PERIODICAL PROCESSING EXECUTED BY UPPER LAYER (MASTER OPERATION SIDE)

PERIODICAL PROCESSING EXECUTED BY UPPER LAYER
(CONTROL OF AUDIO TRANSMISSION THROUGH PARTIAL NETWORK)

SPECIFIC EXAMPLE OF WORD CLOCK SOURCE CHANGE

SPECIFIC EXAMPLE OF WORD CLOCK SOURCE CHANGE (CONTINUATION)

VIEW SHOWING SCHEMATIC CONFIGURATION OF AUDIO NETWORK SYSTEM (MODIFICATION)

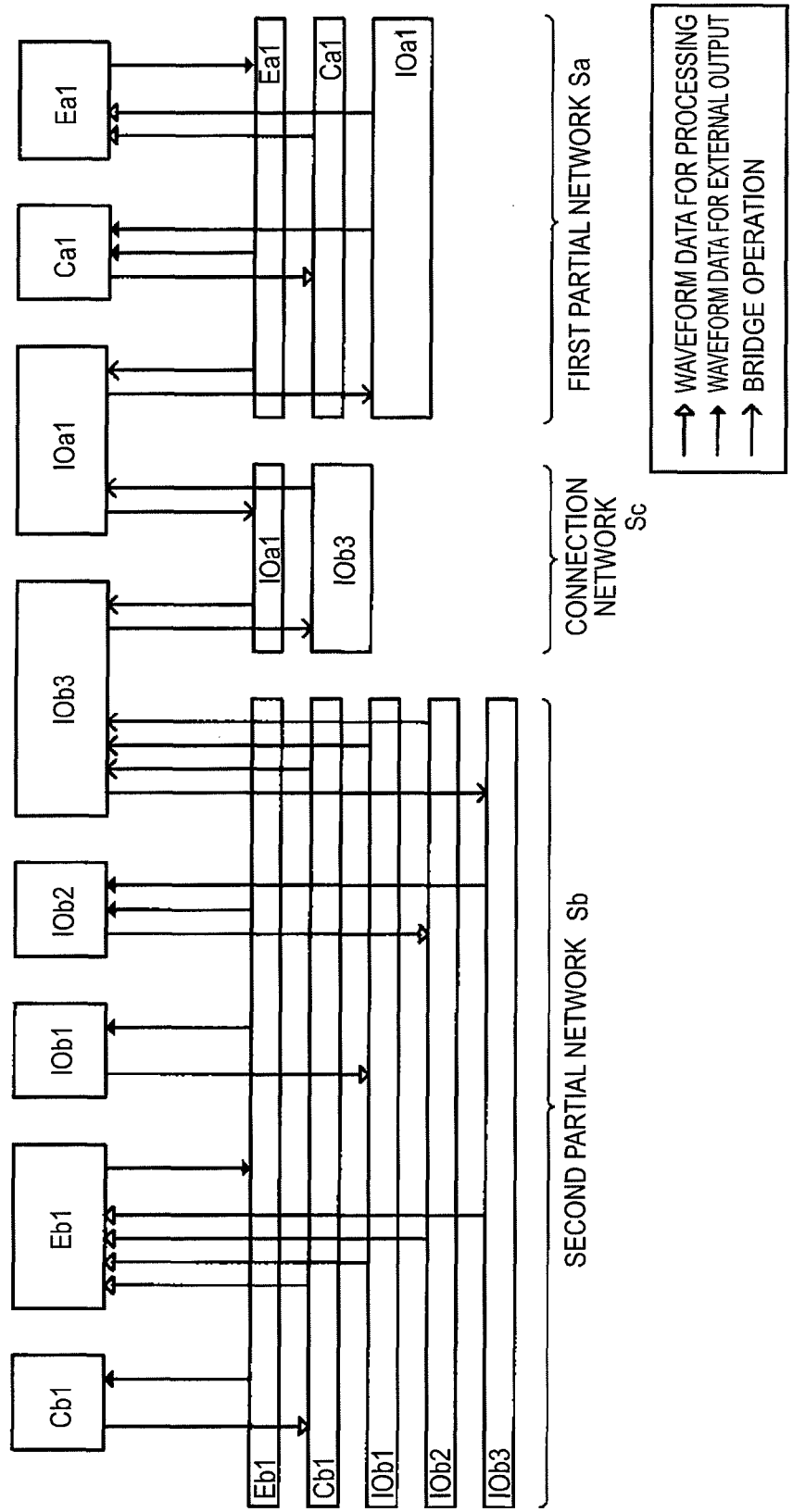

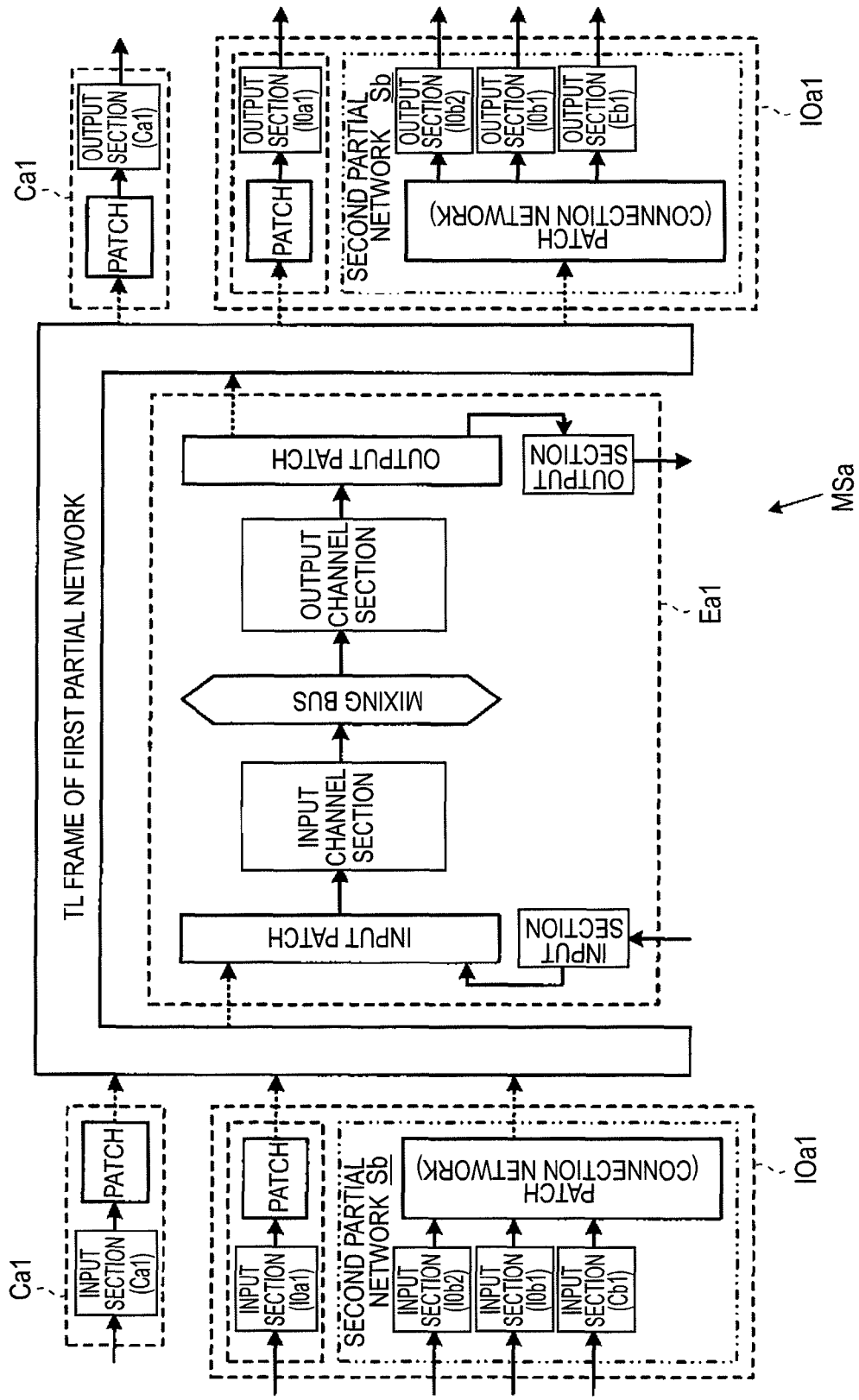

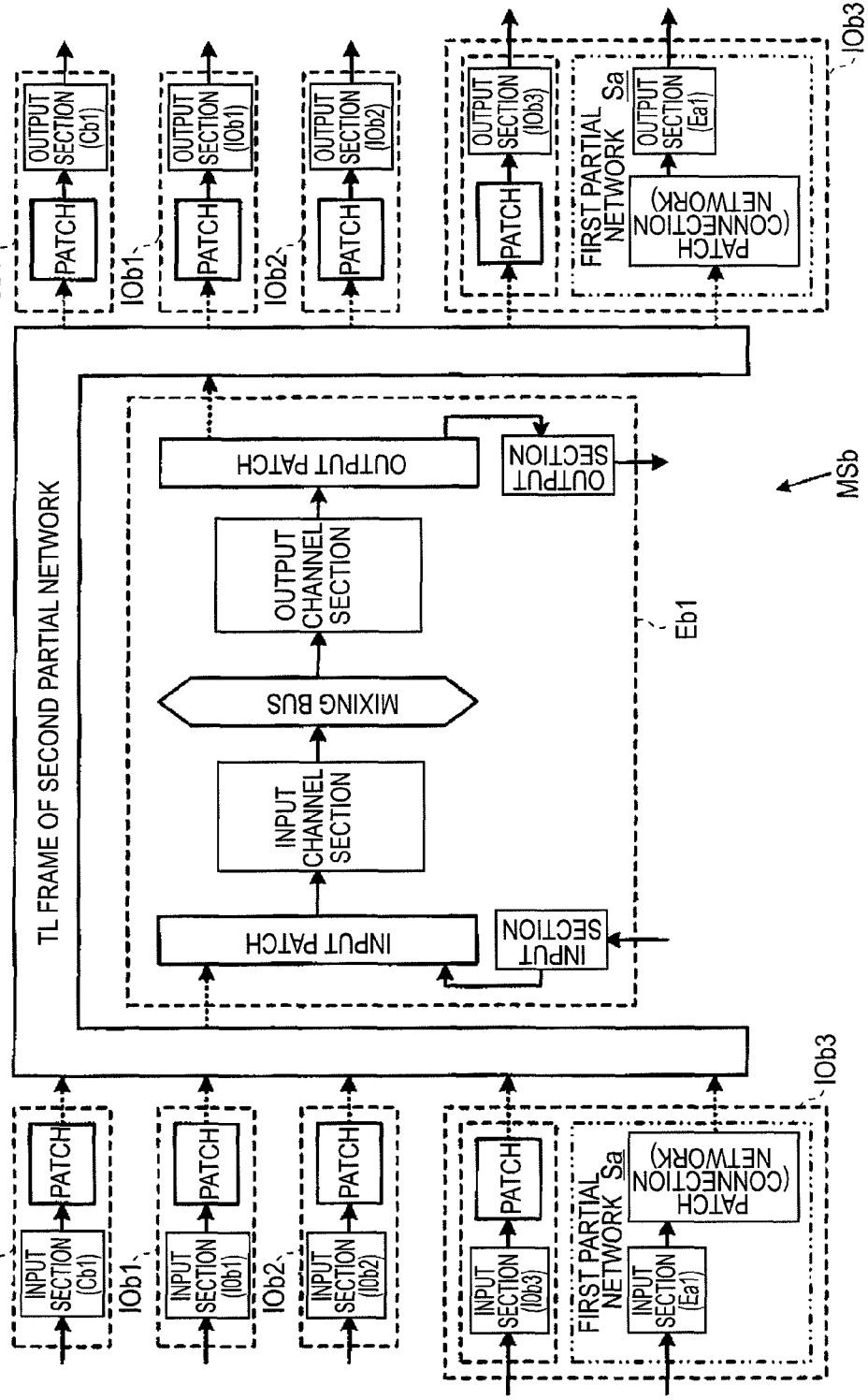

AUDIO SIGNAL PROCESSOR AND AUDIO SIGNAL PROCESSING SYSTEM

BACKGROUND OF THE INVENTION

1. Field of the Invention

The present invention relates to an audio signal processor, which can be connected to a network through which an audio signal is transmitted, and an audio signal processing system including such an audio signal processor.

2. Background Art

In the related art, various network systems for transmitting the data between a plurality of devices are known.

For example, an audio network system for transmitting an audio signal between a plurality of nodes is known, and this is used in concerts, plays, music production, private broadcasting, and so on. Known examples of such an audio network system include CobraNet (trademark) and EtherSound (trademark) disclosed in "CobraNet™, [online], Balcom Co., Ltd. [Retrieved on Mar. 21, 2006], Internet <URL: http://www.balcom.co.jp/cobranet.htm>" and "Carl Conrad, EtherSound™ in a studio environment, [online], Digigram S. A., [Retrieved on Mar. 21, 2006], Internet <URL: http://www.ethersound.com/news/getnews.php?enews_key=101>".

In addition, a network system disclosed in JP-A-2009-94589 is proposed.

In the network system disclosed in JP-A-2009-94589, not only an audio signal but also a control signal, such as an Ethernet (registered trademark) frame, can be stably transmitted from an arbitrary device included in the system to another arbitrary device by making a frame circulate periodically through a ring-shaped transmission path, which is formed by each device included in the system, and making each device read and write the required information from and into the frame.

Moreover, JP-A-2008-72363 discloses a technique in which in a network system where a frame is made to circulate periodically as described above, a master node generates a word clock (sampling clock) and transmits a frame at a timing based on the clock while other nodes generate a word clock by delaying a periodical frame receiving timing as a reference by an appropriate time. In this way, a word clock with the same period and phase as in the master node can be generated in each node. That is, a word clock can also be simultaneously transmitted by transmission of a frame.

In the network systems disclosed in JP-A-2009-94589 and JP-A-2008-72363, however, it is necessary to make a frame circulate a transmission path once within a predetermined period while reading and writing the data from and into a frame for signal transmission by a device.

Therefore, there is a problem that the number of devices which could be built into a system, and the physical length (mainly depending on the length of a cable for connection between devices) of a transmission path are restricted.

In order to cope with such a problem, it may be considered to adopt a configuration in which a bridge device connectable to a plurality of transmission paths is provided in a network system and the plurality of transmission paths are connected to each other through the bridge device.

In the case of adopting the configuration in which the plurality of transmission paths are connected to each other, if the entire system is made to operate on the basis of the same word clock, the word clock needs to be appropriately transmitted from the transmission path, to which a device serving as a word clock source of the entire system belongs, to another transmission path.

Moreover, if the word clock source is changed to another device, a period of time for which signal transmission is not possible occurs until transmission of a frame based on a word clock from a new word clock source is started after the word clock source before the change stops supply of a word clock. Moreover, when a word clock source is changed to a device belonging to a different transmission path from that until then, it takes time to shift the system to the state in which a word clock is transmitted from the new word clock source to the entire system. As a result, the period of time for which signal transmission is not possible is increased.

SUMMARY OF THE INVENTION

The invention has been made in view of such a situation, and it is an object of the invention to shorten a transmission-impossible time in each transmission path, which is caused by changing a clock source to a device of a different transmission path, even when a system is made to have a configuration in which a plurality of transmission paths are connected to each other in the case of transmitting a timing of a sampling clock by a frame which circulates between devices included in the system.

In order to achieve the above object, according to an aspect of the invention, an audio signal processor in which one of the devices included in a network operates as a master and other devices operate as slaves, the master generates and transmits an audio transmission frame every predetermined sampling period, and the audio transmission frame passes through all the devices included in the network and returns to the master includes: first and second interfaces connectable to different networks that serve as interfaces for connection to a network in which transmission of an audio signal between any devices amongst the devices is performed when each device included in the network performs writing and/or reading of the audio signal into and/or from the audio transmission frame. In a state where the processor operates as a slave in a first network connected by the first interface and operates as a master in a second network connected by the second interface, a sampling clock is generated on the basis of a receiving timing of the audio transmission frame while the audio transmission frame is being continuously received in the first network, and a sampling clock is generated at an independent timing and the audio transmission frame is generated and transmitted every period of the sampling clock in the second network if reception of the audio transmission frame is disconnected. An operation as a slave is started in the second network when the second network is reset, and then the first network is reset to start an operation as a master in the first network when continuous reception of an audio transmission frame that another device operating as a master in the second network has transmitted is started.

In such an audio signal processor, at least one of a first transmission operation of writing an audio signal, which is read from an audio transmission frame in the first network, into an audio transmission frame in the second network and a second transmission operation of writing an audio signal, which is read from an audio transmission frame in the second network, into an audio transmission frame in the first network may be performed on condition that transmission and reception of an audio transmission frame in the first network and transmission and reception of an audio transmission frame in the second network synchronize with each other.

In addition, according to another aspect of the invention, there is provided an audio signal processing system including first and second networks connected to each other through a bridge device. The first network is formed by connecting one or more first devices and the bridge device to each other, and one device operates as a master and other devices operate as slaves in the first network. The second network is formed by connecting one or more second devices and the bridge device to each other, and one device operates as a master and other devices operate as slaves in the second network. In the first network, one of the first devices operates as a master to generate and transmit an audio transmission frame every predetermined sampling period, the audio transmission frame passes through all devices included in the first network and returns to the master, and transmission of an audio signal between any devices amongst the devices is performed when each device included in the first network performs writing and/or reading of the audio signal into and/or from the audio transmission frame. The bridge device includes a clock generator which generates a sampling clock on the basis of a receiving timing of the audio transmission frame while the audio transmission frame is being continuously received in the first network and which generates a sampling clock at an independent timing if reception of the audio transmission frame is disconnected. In the second network, the bridge device operates as a master to generate and transmit an audio transmission frame every period of the sampling clock generated by the clock generator, the audio transmission frame passes through all devices included in the second network and returns to the bridge device, and transmission of an audio signal between any devices amongst the devices is performed when each device included in the second network performs writing and/or reading of an audio signal into and/or from the audio transmission frame. The bridge device starts an operation as a slave in the second network when the second network is reset and then resets the first network to start an operation as a master in the first network when continuous reception of an audio transmission frame that another device operating as a master in the second network has transmitted is started.

According to the audio signal processor and the audio signal processing system of the invention described above, even when a system is made to have a configuration in which a plurality of transmission paths are connected to each other in the case of transmitting a timing of a sampling clock by a frame which circulates between devices included in the system, a transmission-impossible time in each transmission path caused by changing a clock source to a device of a different transmission path can be shortened.

BRIEF DESCRIPTION OF THE DRAWINGS

FIG. 21 is a view showing the situation in which each device in the audio network system shown in FIG. 20 reads and writes an audio signal from and into a TL frame;

FIG. 22 is a view showing the configuration of a signal processing function in a first mixer system formed in the audio network system shown in FIG. 20; and FIG. 23 is a view showing the configuration of a signal processing function in a second mixer system formed in the audio network system shown in FIG. 20.

DETAILED DESCRIPTION OF THE INVENTION

Hereinafter, embodiments of the invention will be specifically described with reference to the accompanying drawings.

1. Outline of an Audio Network System According to an Embodiment of the Invention 1.1 Entire Configuration First, FIG. 1 shows the schematic configuration of an audio network system which is an embodiment of a network system of the invention.

Figure 1:
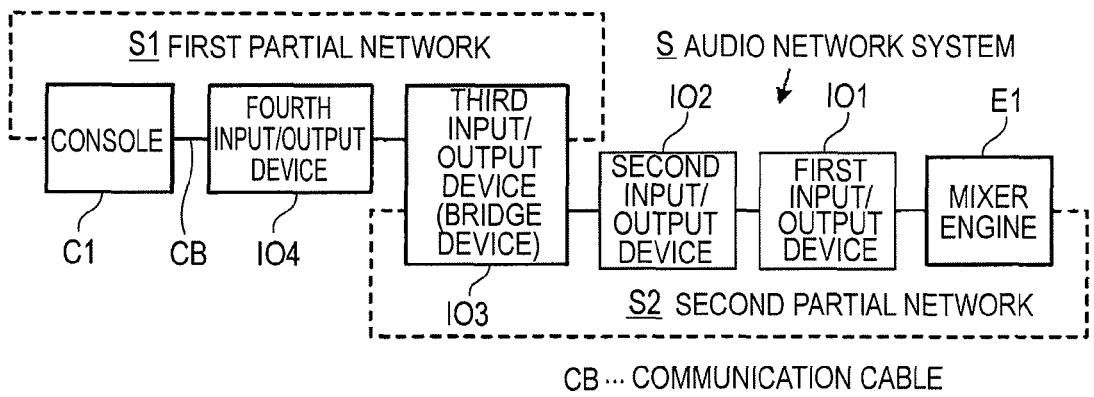
FIG. 1 is a view showing the schematic configuration of an audio network system which is an embodiment of a network system of the invention.

As shown in FIG. 1, an audio network system S has a configuration in which a first partial network S1 and a second partial network S2 are connected to each other through a third input/output device IO3 that is a bridge device.

Moreover, in the first partial network S1, a console C1, a fourth input/output device IO4, and the third input/output device IO3 are connected to each other in the form of a cascade through a communication cable CB indicated by a solid line or connected in the form of a loop through cables including a cable indicated by a dotted line.

In the second partial network S2, the third input/output device IO3, a second input/output device IO2, a first input/output device IO1, and a mixer engine E1 are similarly connected to each other in the form of a cascade or a loop.

The third input/output device IO3 has a network I/F (interface) for connection to the first partial network S1 and a network I/F for connection to the second partial network S2 separately. Moreover, in each partial network, a device belonging to the partial network can transmit/receive the data to/from another device belonging to the partial network, and the data input to one partial network may also be transmitted to the other partial network. This may function as a bridge device which connects two partial networks to each other.

In addition, each of the first to fourth input/output devices IO1 to IO4 is a device having a plurality of input ports, through which a plurality of audio signals from the outside are input to the audio network system S, and/or a plurality of output ports, through which a plurality of audio signals are output to the outside. In the case of performing analog input/output, each of the first to fourth input/output devices IO1 to IO4 has an A/D converter and a D/A converter in order to perform conversion between a digital audio signal, which is used in the audio network systems, and an analog audio signal input or output from a terminal. The number of input or output ports or other functions may differ with each device.

The console C1 is a device for receiving an operation on each device, which is included in the audio network system S, and has an operation panel with a number of operators and indicators.

The mixer engine E1 is a device which acquires and mixes desired audio signals among audio signals of a plurality of channels, which are input from respective input/output devices and are then transmitted through the audio network system S. First, the plurality of audio signals (waveform data) transmitted to the mixer engine E1 are subjected to signal processing of a compressor, an equalizer, and the like in each of the plurality of input channels. Then, the plurality of audio signals are level-controlled and mixed.

Moreover, the plurality of audio signals acquired by mixing are further subjected to signal processing of a compressor, an equalizer, and the like in an output channel and level-controlled, and are then transmitted to each input/output device through the audio network system S and output to the outside.

Moreover, the mixer engine E1 itself has a local input port or a local output port. Accordingly, an audio signal from the input port can be mixed, and an audio signal obtained as a mixing result can be output to the output port.

1.2 Configuration of a Partial Network.

Figure 2A:
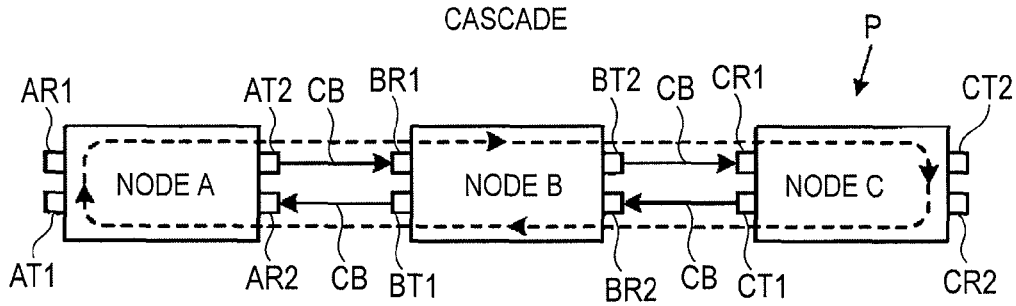
FIGS. 2A and 2B are views showing the schematic configuration of a partial network shown in FIG. 1.
Figure 2B:
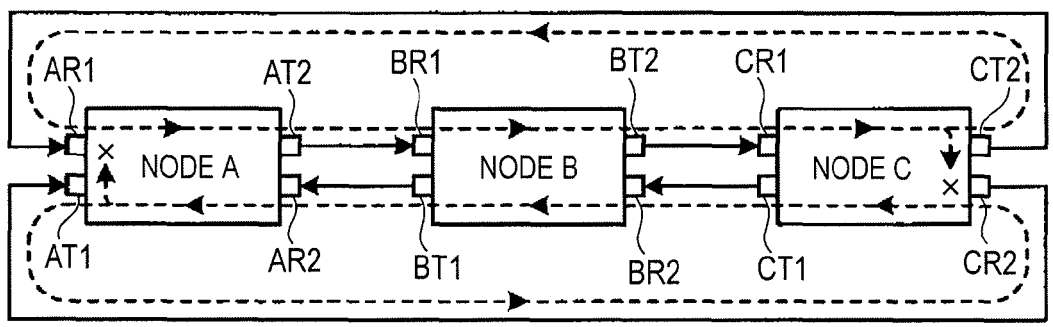

Next, FIGS. 2A and 2B show the schematic configuration of a partial network.

As shown in FIGS. 2A and 2B, a partial network P is formed by connecting nodes, each of which has two sets of signal receiving interfaces (I/F) that are signal receiving means for performing one-way communication and signal transmitting interfaces (I/F) that are signal transmitting means, in a sequential manner through the communication cable CB. These nodes correspond to the console C1, the input/output devices IO1 to IO4, and the mixer engine E1 in FIG. 1. Although an example formed by three nodes of A to C is shown herein, the number of nodes may be set to an arbitrary number of 2 or more.

In the node A, a signal receiving I/F AR1 and a signal transmitting I/F AT1 are a set of I/Fs, and a signal receiving I/F AR2 and a signal transmitting I/F AT2 are another set of I/Fs. Also for the nodes B and C, an I/F in which the character "A" at the head of a reference numeral is replaced with "B" or "C" corresponds to the same relationship.

In addition, a connection between nodes is made by connecting a set of signal receiving I/F and signal transmitting I/F to a set of signal transmitting I/F and signal receiving I/F of another node through the communication cable CB. For example, between the nodes A and B, the signal receiving I/F AR2 and a signal transmitting I/F BT1 are connected to each other and the signal transmitting I/F AT2 and a signal receiving I/F BR1 are connected to each other. Moreover, between the nodes B and C, a set of I/Fs of the node B and a set of I/Fs of the node C are connected to each other.

Here, as shown in FIG. 2A, a state where each node is connected as one line having ends is called a "cascade connection". In this case, using the cable CB which makes a connection between nodes, it is possible to form one ring-shaped data transmission path as indicated by a dotted line. In addition, each node can perform transmission and reception of the data between any node on the transmission path by transmitting a frame to the transmission path so as to circulate at predetermined periods and reading and writing the required information from and into the frame.

Moreover, in the partial network P, one node becomes a master node (master of such a partial network unit is called a "partial master"), generates an audio transmission frame for transmitting an audio signal, and makes it circulate through the transmission path periodically or manages a network. The audio transmission frame generated by the partial master is called a "TL frame".

In addition to the cascade connection shown in FIG. 2A, if I/Fs which are not used in the nodes of both ends are connected through the communication cable CB, two ring-shaped data transmission paths can be formed as shown in FIG. 2B. In addition, each node can perform transmission and reception of the data between any nodes on the transmission path by transmitting frames in these paths and reading and writing the required information from and into each of the frames. Such a connection state between nodes is called "loop connection".

In the case of performing communication of the amount of information, which can be transmitted only with a TL frame circulating through one transmission path, in the loop connection state, even if disconnection occurs in one place, transmission of the TL frame is repeated at both sides of the disconnected place. That is, both sides of the disconnected place are regarded as both ends of the cascade connection, and the system is quickly rearranged to a cascade-connected system shown in FIG. 2A. As a result, transmission of the TL frame can be continued with a loss of about 0 to 2 frames (refer to JP-A-2007-259347).

In FIG. 2, two cables are shown. However, if a set of signal receiving I/F and signal transmitting I/F are provided adjacent to each other or as one body, a set of I/Fs may be connected to each other by one cable in which two cables are bound together.

In addition, a device connected to two or more partial networks like the third input/output device IO3 shown in FIG. 1 has two sets of signal transmitting I/Fs and signal receiving I/Fs, which are used in the partial networks, per partial network to be connected to. Accordingly, the third input/output device IO3 has four sets of signal transmitting I/Fs and signal receiving I/Fs.

In addition, if a required I/F is provided in each node, it is also possible to connect an external device and to write the data received from the external device into a TL frame and transmit it to another node or to transmit the data read from the TL frame to the external device.

As such an external device, for example, an external console may be considered. Moreover, it may be considered to execute an operation in which the console transmits to a node of a connection destination a command according to an operation received from a user, the node writes the command into a TL frame and transmits it to another node or the node of the connection destination reads a response, level data, or the like transmitted from another node in a state written in the TL frame and transmits it to the console, and it is used for display of an operator state or level display in the console.

1.3 Configuration of a TL Frame

Figure 3:
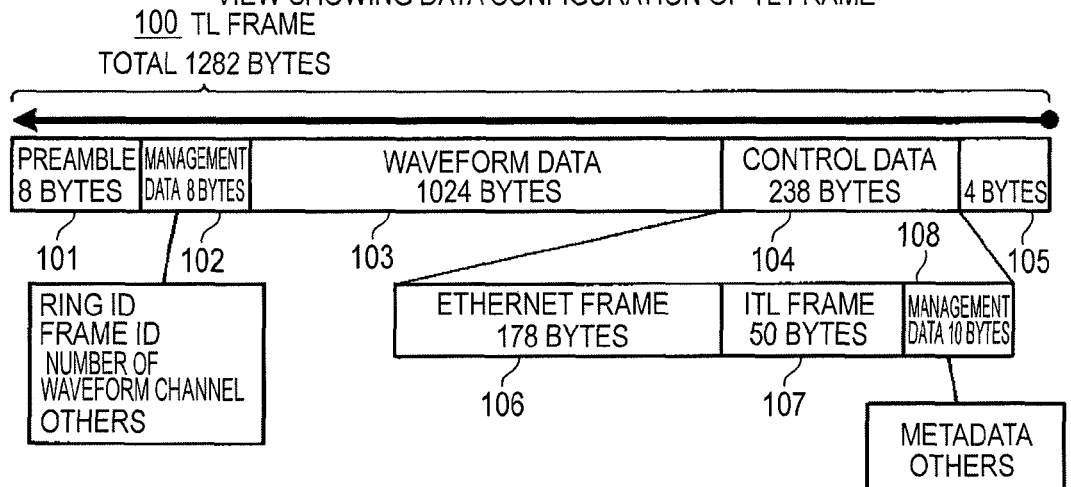
FIG. 3 is a view showing an example of the configuration of a TL frame transmitted through a transmission path of the partial network shown in FIG. 1.

Next, FIG. 3 shows an example of the configuration of a TL frame transmitted through a transmission path of the partial network P. In addition, the width of each region shown in FIG. 3 does not necessarily correspond to the amount of data.

As shown in FIG. 3, a TL frame 100 has a size of 1282 bytes. The TL frame 100 includes regions of preamble 101, management data 102, waveform data (audio data) region 103, control data region 104, and FCS (Frame Check Sequence) 105 in order from the head. The size of each region is constant regardless of the amount of data written in the region. In addition, the size of each region other than the FCS 105 shown herein is an example and may be appropriately changed.

Moreover, the preamble 101 is data total of 8 bytes. In the preamble 101, preamble and SFD (Start Frame Delimiter) specified by IEEE (Institute of Electrical and Electronic Engineers) 802.3 are written.

The management data 102 is 8-byte data. As the data that each node in the partial network P uses for management of the data included in a TL frame, a ring ID indicating which transmission path in a system the frame circulates through, a frame ID which is a frame serial number, the number of channels of the waveform data in the waveform data region 103, and the like, are written.

In addition, 1024 bytes are ensured as the waveform data region 103, and the waveform data of 1 sample 32 bits which is data of an audio signal can be written for 256 channels. That is, in this system, audio signals for 256 channels can be transmitted by making one TL frame 100 circulate. Moreover, for the regions of channels (empty channels) which are not used for transmission among 256 channels, it does not matter which is written there. In addition, the size of a region of each channel may be changed according to the number of bits of waveform data. In this case, 16-bit waveform data can be transmitted for 512 channels, and 24-bit waveform data can be transmitted for 340 channels.

Moreover, in the waveform data region 103, a channel is assigned in advance to each node included in the partial network P, and each node writes the output waveform data at the position of the channel assigned thereto. A partial master performs this assignment on the basis of a request from each node for every partial network P.

Moreover, 238 bytes are ensured as the control data region 104. Here, an Ethernet frame region 106, an ITL frame region 107, and a management data region 108 are provided.

In the Ethernet frame region 106 among these regions, a frame (Ethernet frame) based on IEEE (Institute of Electrical and Electronic Engineers) 802.3 format obtained by further forming an IP packet, which is a packet for communication between nodes based on IP (Internet Protocol), as a frame is written.

In addition, when the Ethernet frame to be written does not fall within the prepared size (here, 178 bytes), it is divided into a number of blocks required at the frame transmission side and one block is written per TL frame. Then, by extracting the data from a plurality of TL frames 100 and combining the data together at the frame receiving side so that the frames before division can be restored, the Ethernet frame can be transmitted between nodes in the same manner as transmission in the normal Ethernet (registered trademark).

In addition, the data of an ITL frame which is a frame used for transmission of a command between adjacent nodes and a response to the command is written in the ITL frame region 107. Although not described in detail, the ITL frame is used for information transmission when forming a frame transmission path within a system or used for information transmission after forming the system.

The management data region 108 is a region where the data that each node in the system uses for management of the data included in the TL frame 100 is written. Example of the data written in the management data region 108 includes metadata used for level display, a cut detection flag indicating that the TL frame 100 was cut during transmission, and an error flag indicating that an error occurred during transmission of the TL frame 100.

In addition, the FCS 105 is a field for detecting an error of a frame specified by IEEE 802.3.

In the partial network P, real-time transmission of an audio signal and transmission of an Ethernet frame can be simultaneously performed by making the TL frame circulate between nodes. By transmission of the Ethernet frame using the Ethernet frame region 106, each node included in the partial network P is in an environment equivalent to the case of being connected through one Ethernet (trademark).

Moreover, as will be described later, if a bridge device reads the data from a TL frame of one partial network and writes the data in a TL frame of the other partial network, transmission through a bridge device becomes possible for both the waveform data and the Ethernet frame. Therefore, it can be said that each device, which is included in the audio network system S, is also in an environment equivalent to the case of being connected through one Ethernet (trademark).

1.4 Transmission Method of a TL Frame.

Figure 4:
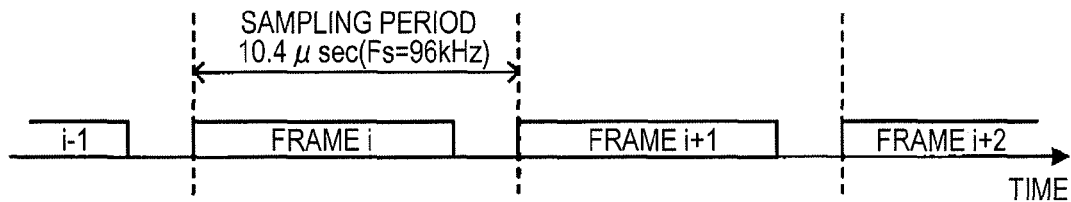
FIG. 4 is a view showing a transmission timing of a TL frame.

Next, FIG. 4 shows a transmission timing of the TL frame 100 shown in FIG. 3.

As shown in FIG. 4, in the partial network P, one TL frame 100 is made to circulate between nodes every 10.4 μsec (microsecond), which is one sampling period of 96 kHz (kilohertz), and each node writes an audio signal to a desired channel of the TL frame or reads an audio signal from a desired channel. Accordingly, for 256 signal transmission channels, the waveform data of one sample can be transmitted between nodes every sampling period.

If data transmission based on the Ethernet (registered trademark) method of 1 Gbps (gigabit per second) is adopted, the time length of the TL frame 100 is 1 nanosecond×8 bits×1282 bytes=10.26 μsec, and accordingly the transmission is completed within one sampling period.

Figure 5:
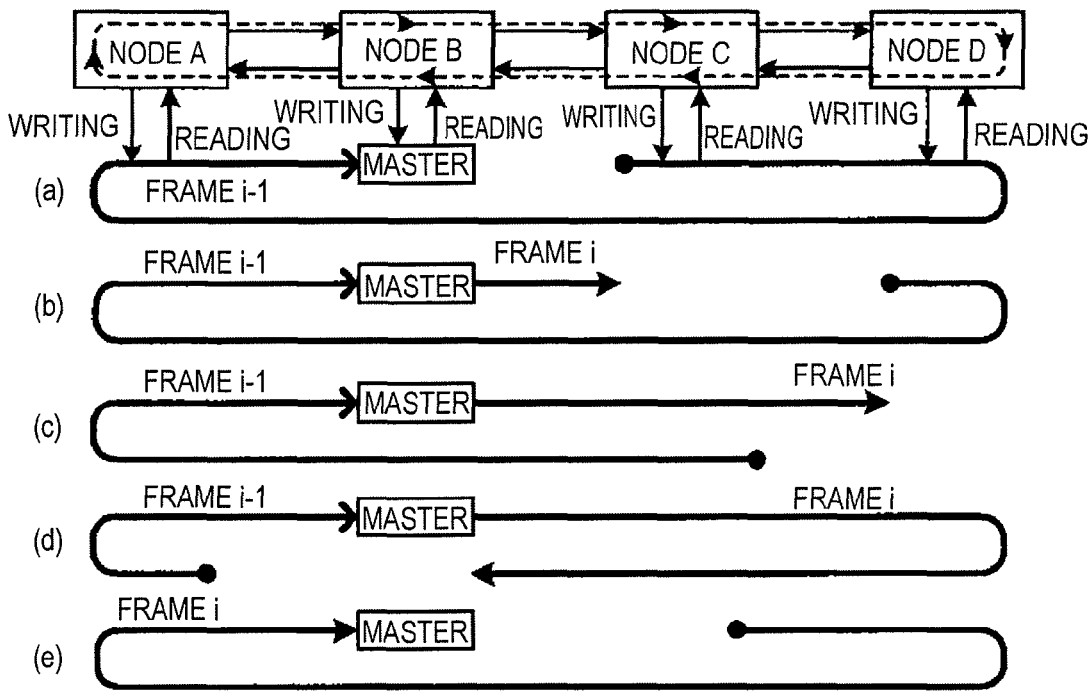
FIG. 5 is a view for explaining the transmission situation of a TL frame at the time of transmission of an audio signal on a partial network.

Next, FIG. 5 shows a transmission situation of the TL frame shown in FIG. 3 at the time of transmission of an audio signal on a partial network.

Here, a partial network in which the four nodes of nodes A to D are cascade-connected is considered. Moreover, in the case of making the TL frame 100 circulate through each node in the partial network, one of the nodes is determined as a partial master and only the node generates a TL frame (TL frame with a different serial number) of a new sampling period and transmits a TL frame, which is generated every sampling period, to the next node. Nodes other than the partial master are slave nodes. Each of the slave nodes receives a TL frame from a previous node and performs transmission processing for transmitting the TL frame to the next node.

If the node B which is a partial master first transmits a TL frame toward the node C in the right direction in the drawing at a word clock timing, the TL frame is transmitted in order of the nodes B->C->D->C->B->A->B as shown by a dotted line and returns to the node B. At the time of this transmission, each node reads the waveform data or the control data, which is to be received from another node, and writes the waveform data or the control data, which is to be transmitted to another node, into the TL frame until each node receives the TL frame and then transmits it.

Then, when the TL frame returns after circulating through the transmission path once, the partial master rewrites the management data of the TL frame to generate a TL frame of the next sampling period and supplies it for transmission in an appropriate sampling period. In this case, the partial master also performs reading and writing of data from and into the TL frame similar to the other nodes.

By repeating the above, one TL frame can be made to circulate through each node per sampling period as shown in a time-series manner in FIG. 5. In these drawings, a black arrow indicates the head of a TL frame, and a black dot indicates the end of the TL frame. The arrow of a line is shown in order to make discontinuity of the TL frame easily understood.

Moreover, in the case of performing loop connection to form two transmission paths in a partial network, it is possible to form a transmission path, in which a TL frame transmitted rightward in the drawing after being generated by the node B that is a partial master is transmitted in the order of the nodes B->C->D->A->B, and a transmission path, in which a TL frame transmitted leftward in the drawing after being generated by the node B is transmitted in the order of the nodes B->A->D->C->B, as can be seen from FIG. 2. In this case, the TL frame passes through all the nodes once while going through the transmission path once. Accordingly, each node performs reading and writing of data at the time of passage.

1.5 Hardware Configuration and Basic Operation of Each Device Included in a System Next, hardware for transmitting the TL frame, which has been described above, and its operation will be described.

Figure 6:
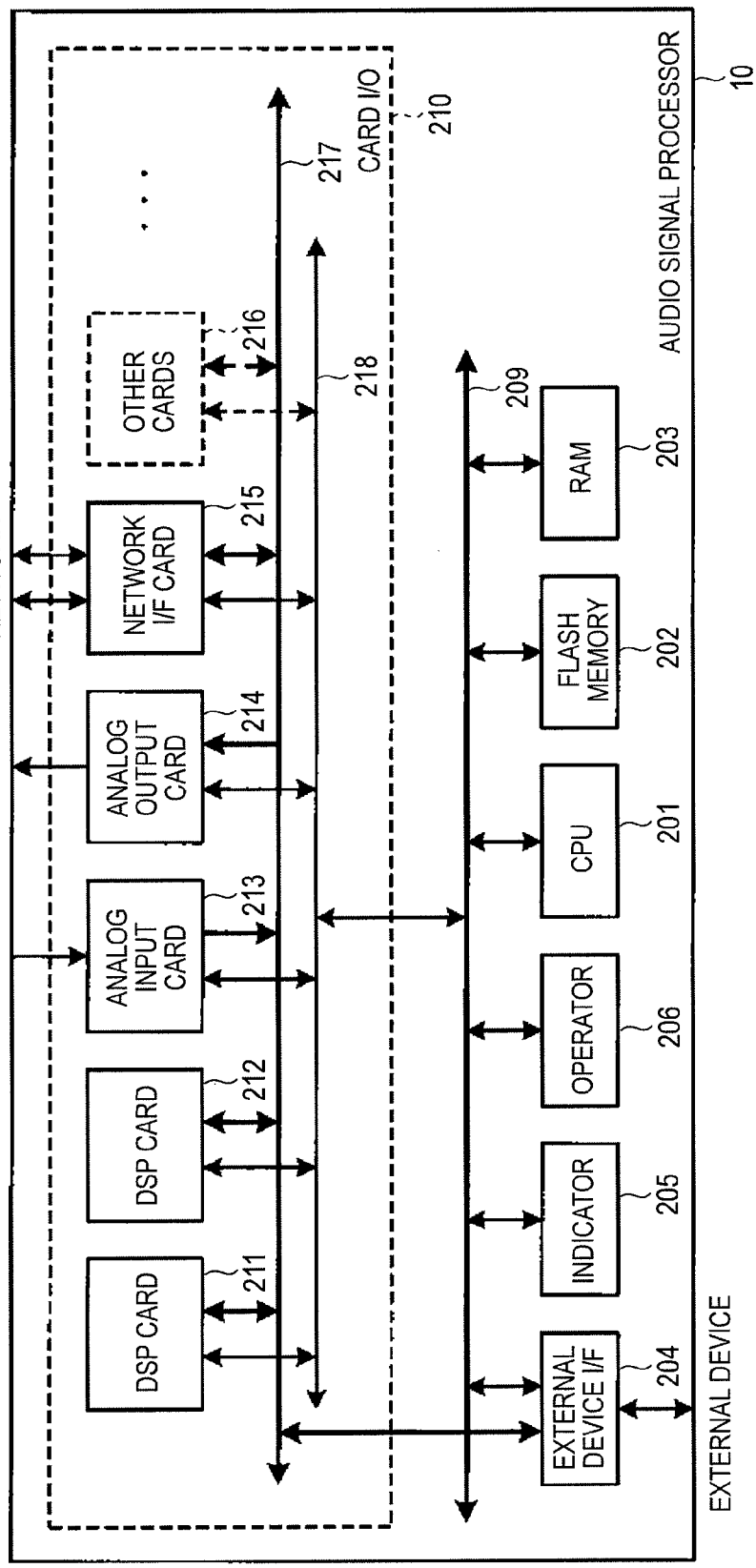
FIG. 6 is a view showing the hardware configuration of an audio signal processor which becomes each node included in the audio network system shown in FIG. 1.

FIG. 6 shows the hardware configuration of an audio signal processor which becomes each node included in the above-described audio network system S.

As shown in FIG. 6, an audio signal processor 10 includes a CPU 201, a flash memory 202, a RAM 203, an external device I/F (interface) 204, an indicator 205, and an operator 206, and these are connected to each other by a system bus 207. In addition, the audio signal processor 10 includes a card I/O (input/output section) 210 connected to the external device I/F 204 and the system bus 207.

In addition, the CPU 201 is a control means for controlling the overall operation of the audio signal processor 10. By executing a necessary control program stored in the flash memory 202, the CPU 201 controls a display of the indicator 205, detects an operation of the operator 206 and controls setting/changing of a value of a parameter or an operation of each section according to the operation, transmits a command to another audio signal processor through the card I/O 210, or performs processing according to a command received from another audio signal processor through the card I/O 210.

The flash memory 202 is a rewritable nonvolatile storage means for storing a control program executed by the CPU 201 and the data, which should be left even if the supply of power is stopped.

The RAM 203 is a storage means which stores the data to be temporarily stored or which is used as a work memory of the CPU 201.

The external device I/F 204 is an interface to which various external devices are connected in order to perform inputting and outputting. For example, an interface for connecting an external display, a mouse, a keyboard for text input, an operation panel, a PC, and the like are prepared. The PC is a normal personal computer which includes a CPU, a memory, a hard disk, a display, a keyboard, a mouse, various interfaces, and the like and which is run by an operating system (OS), such as Windows (trademark). The user uses the PC by starting desired application software under the OS.

The external device I/F 204 is also connected to an audio bus 217 of the card I/O 210, and can transmit to an external device the waveform data flowing through the audio bus 217 or can input to the audio bus 217 the waveform data received from the external device. The external device I/F 204 may be any interface, such as Ethernet, USB, and IEEE 1394.

The indicator 205 is a display means for displaying various kinds of information according to the control of the CPU 201 and may be formed by a liquid crystal display (LCD) or a light emitting diode (LED), for example.

The operator 206 is for receiving an operation on the audio signal processor 10 and may be formed by various keys, buttons, a dial plate, or a slider, for example.

The configurations of the indicator 205 and the operator 206 may largely differ according to the function of the device. For example, when the audio signal processor 10 is formed as a console, a large-sized display, a number of buttons, switches, electric fader, and the like for receiving the setting of a signal processing parameter or a patch for a number of channels are provided. When the audio signal processor 10 is formed as an input/output device, a simple lamp or button for mode setting and a power source is provided.

In addition, the card I/O 210 includes the audio bus 217 and a control bus 218 and is an interface for making possible input/output of an audio signal and a control signal to/from the audio signal processor 10 and performing the processing by mounting various card modules in the buses. Each card module mounted herein transmits and receives the waveform data through the audio bus 217, and also transmits and receives a control signal to and from the CPU 201 through the control bus 218 so as to be controlled by the CPU 201.

The audio bus 217 is a local bus for audio signal transmission which transmits the waveform data of a plurality of channels from an arbitrary card to another arbitrary card in a time-division manner by one sample at a timing based on a sampling period. One of the plurality of connected cards becomes a master, and it controls a reference timing of time-division transmission of the audio bus 217 on the basis of a word clock generated and supplied by the corresponding card. Each of the other cards becomes a slave and generates a word clock of each card on the basis of the reference timing.

FIG. 6 shows an example where DSP (digital signal processor) cards 211 and 212, an analog input card 213, an analog output card 214, and a network I/F card 215 are mounted in the card I/O 210.

The various cards mounted in the card I/O 210 execute processing according to the function of the card, that is, execute input of the waveform data from the outside, output of the waveform data to the outside, signal processing on the waveform data, transmission and reception of the waveform data to the partial network, and so on at a timing synchronized with a word clock (sampling period of the waveform data).

Among these cards, the network I/F card 215 includes two sets of signal transmission I/Fs and signal receiving I/Fs and has a function for transmission of the TL frame 100 in the partial network P, which was described with reference to FIGS. 2A to 4, and a function for reading and writing of waveform data or control data from and into the TL frame 100. Regarding the details of the configuration of the network I/F card 215 required to realize these functions, those disclosed in JP-A-2009-94589 may be referred to.

Moreover, although cards other than the network I/F card 215 have functions of audio signal processing, input/output of an analog signal, and the like, cards may be optionally selected and mounted according to the functions demanded to the audio signal processor 10. In addition to the cards mentioned herein, it may also be considered to mount various card modules, such as digital input/output, an audio source, a recorder, and an effector, as another card 216.

2. Procedures of Forming a Transmission Path in an Audio Network System

Figure 7:
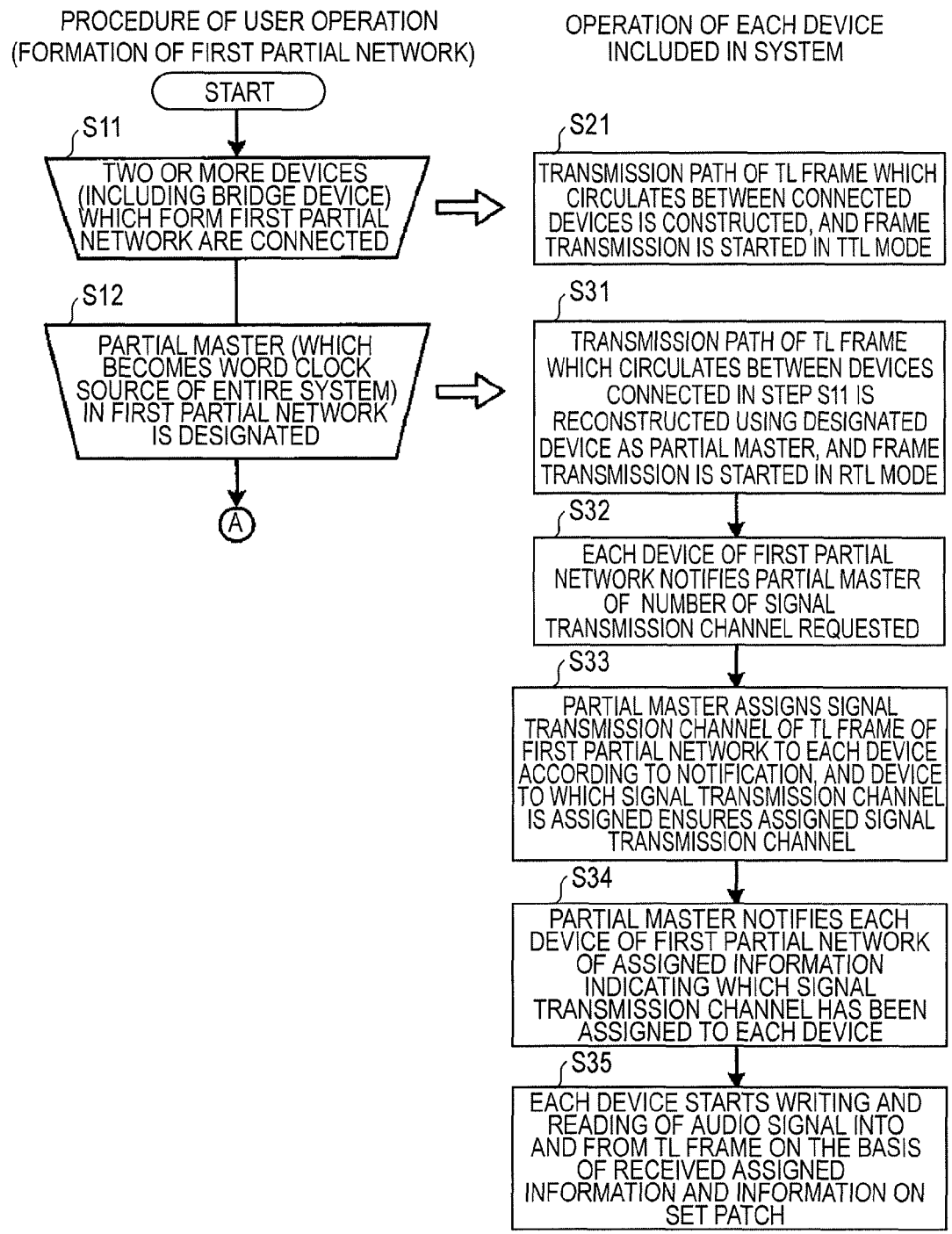
FIG. 7 is a view showing the procedures of a user's operation and an operation of each device according to the user's operation when forming a transmission path of a TL frame passing through the audio network system shown in FIG. 1 and devices belonging to the system.
Figure 8:
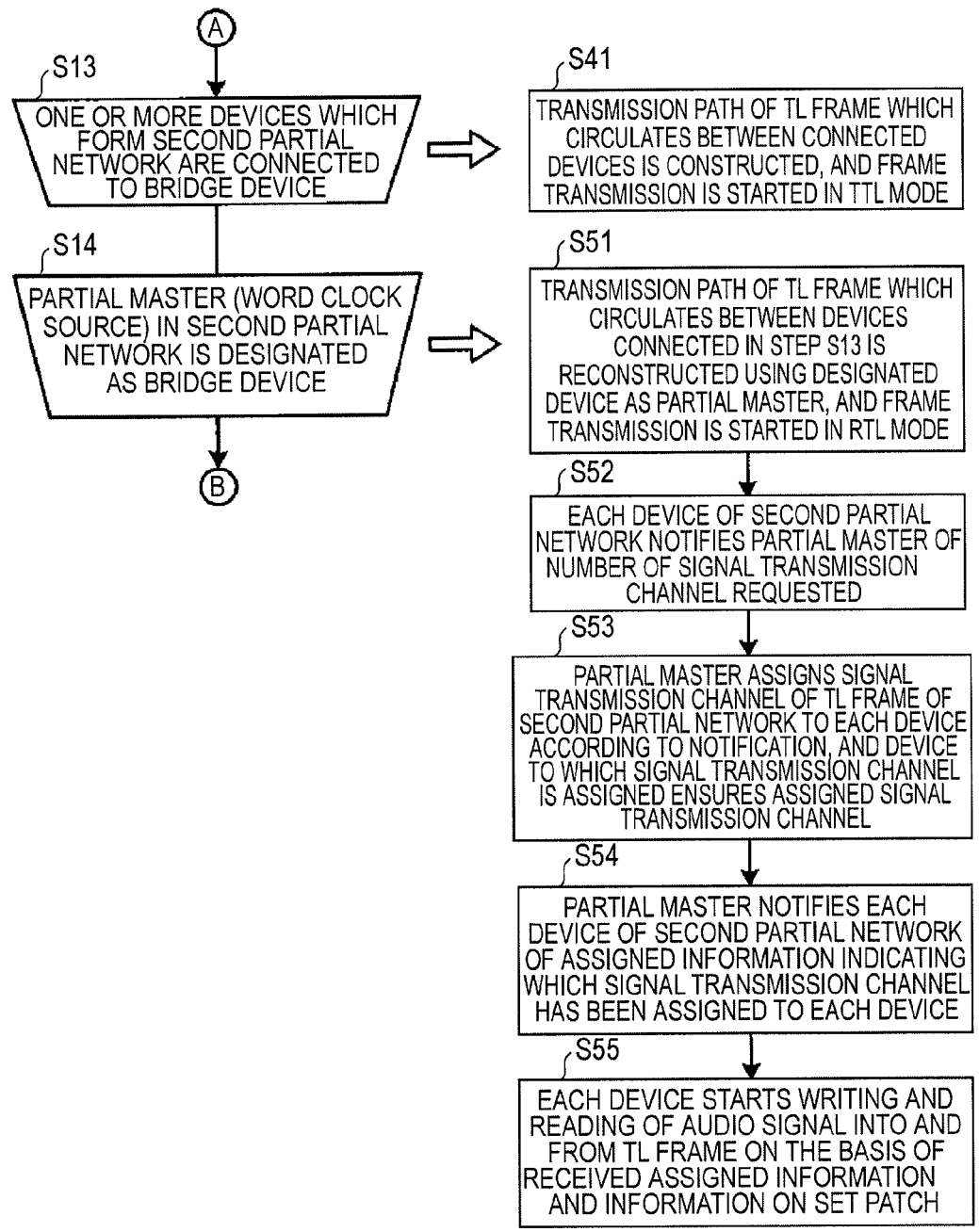
FIG. 8 is a view showing the continuation of FIG. 7.
Figure 9:
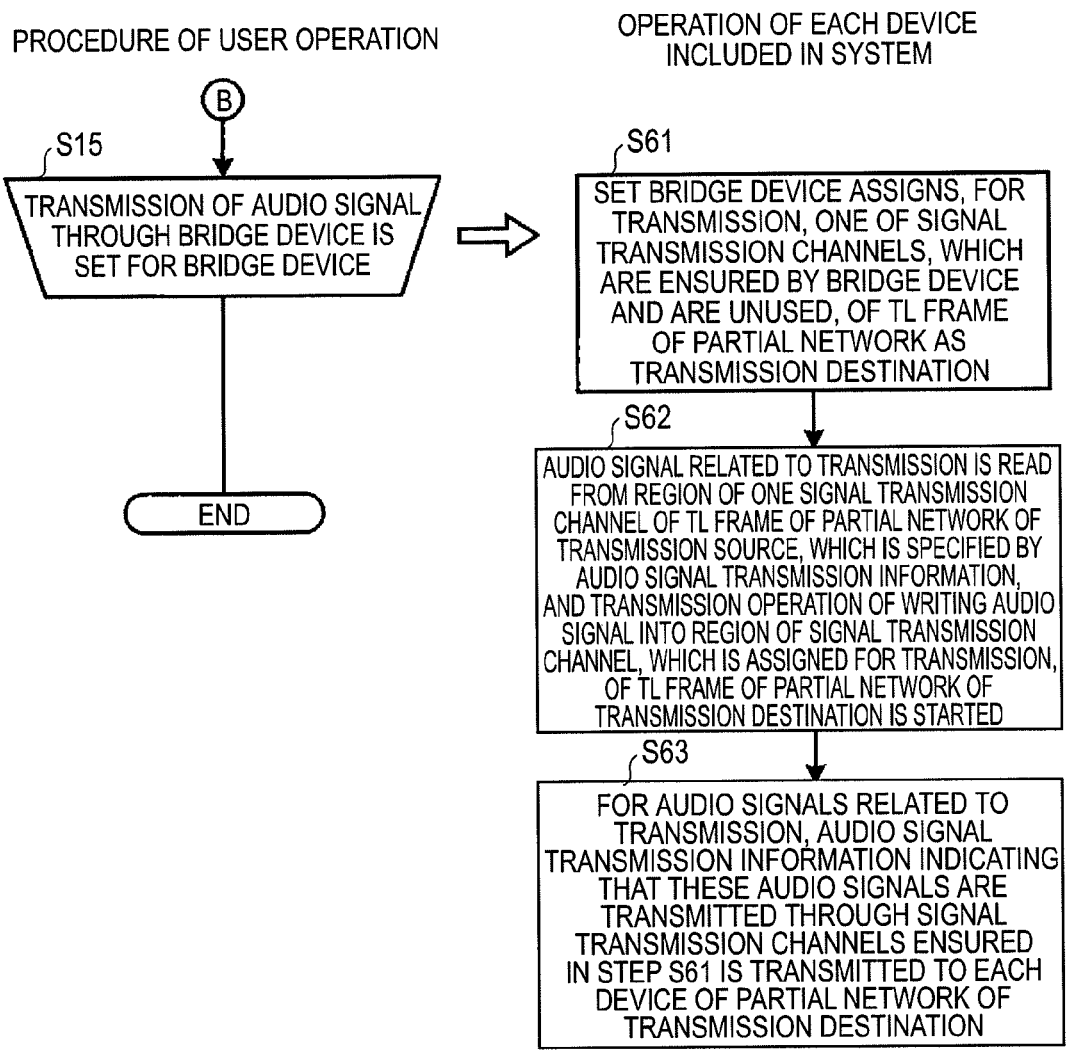
FIG. 9 is a view showing the continuation of FIG. 8.

Next, FIGS. 7 to 9 show the procedures of a user's operation and an operation of each device according to the user's operation when forming a transmission path of a TL frame passing through the audio network system S and devices belonging to the system. Procedures in the case of forming a transmission path in a state where each device is not physically connected are shown in these drawings.

When forming the audio network system S shown in FIG. 1, first, a user connects two or more devices included in the first partial network S1 in the form of a cascade or a loop (S11). In this case, at least one of the devices needs to be a device which becomes a bridge device. In addition, "connection" referred to herein includes all of a case of connecting devices already powered on with a communication cable, a case of turning on devices already connected with a communication cable, and a case of connecting devices, which do not correspond to the above cases, with a communication cable and then turning on the devices.

Then, if such a connection is made, the connected devices automatically check the presence of different devices and topology of the connection (whether or not it is a cascade connection or a loop connection and the connection order of the devices). Then, a transmission path of the TL frame shown in FIG. 2, which circulates between the connected devices, is formed according to the topology, and transmission of the TL frame along the transmission path is started (S21).

In this step, however, reading and writing of an audio signal from and into a TL frame is not performed yet, and it operates in a mode (TTL mode) in which transmission of the control data between devices is performed using the ITL frame region 107 or the control data region 104 of the TL frame 100. In addition, a temporary partial master, which becomes a node that generates a TL frame, is set by an appropriate algorithm through negotiation between devices.

As the procedures of forming a transmission path in this case, for example, those disclosed in JP-A-2009-94589 may be adopted.

After step S11, the user designates a partial master in the first partial network S1 (S12). The device designated as the partial master becomes a word clock source of the entire audio network system S. In addition, it is preferable to perform this designation after completion of step S21, but this is not essential.

Then, if the designation in step S12 is made, each device operating in the TTL mode reconstructs a transmission path of a TL frame, which circulates between the devices connected in step S11, using the device designated in step S12 as a partial master. This time, transmission of the TL frame is started in a mode (RTL mode) in which reading and writing of an audio signal from and into the TL frame are possible, and an operation as the first partial network S1 is started (S31).

Then, each device of the first partial network S1 notifies the partial master (partial master of the partial network to which the device belongs) designated in step S12 of the number of signal transmission channel that the device requests (S32). Here, the number of channel notified indicates that an audio signal of which channel is written in the TL frame 100 by the device. In addition, the number of signal transmission channel that a device requests is set in advance for every device by the user.

In addition, the notification in step S32 may be performed by an Ethernet frame at the partial master address written in the control data region 104 of the TL frame 100 or may be performed by transmitting an ITL frame written in the ITL frame region 107 up to the partial master sequentially through adjacent nodes while interrupting it. The same is true for communication between the partial master and each device, which will be described later.

On the other hand, when the partial master receives the notification in step S32, the partial master assigns a signal transmission channel in the TL frame 100 to the notification source device in response to the notification, and the device to which the signal transmission channel is assigned ensures the assigned signal transmission channel (S33). Since there is no problem no matter which channel is assigned to which device, an arbitrary algorithm, such as assigning channels in the order of arrival from the head, may be adopted for assignment.

In addition, the partial master notifies the assignment information, which indicates which signal transmission channel has been assigned to each of the plurality of devices in step S33, to each device of the first partial network S1 (partial network in which the device itself serves as a partial master) (S34). Each device determines in which signal transmission channel an audio signal is to be written with reference to the assignment information. Accordingly, it is preferable to perform the notification of the assignment information whenever a new assignment is performed, that is, whenever an assignment of the signal transmission channel is changed.

Then, when the notification in step S34 is received, each device starts writing and reading of an audio signal into and from a TL frame on the basis of the received assignment information and the set information regarding a patch (S35). As a result, in the first partial network S1, transmission and reception of an audio signal and a control signal between devices serving as nodes become possible.

Here, the patch is a connection from a source of an audio signal to a sink. The user can set a patch between a desired source and a desired sink by operating a console.

For example, it is possible to set a patch from an input port (source) of an input/output device or a mixer engine to an input channel (sink) of the mixer engine or a patch from an output channel (source) of the mixer engine to an output port (sink) of the input/output device or the mixer engine. Alternatively, the patch may be set from the input port of the input/output device to the output port of another input/output device.

One connection is to connect one source with one sink, and the setting of the patch includes setting of one or a plurality of connections.

In step S34 described above, for example, in the case where a source of a first device and a sink of a second device are connected to each other in the patch setup information, if the first device does not write an audio signal of the source related to the connection in any region of the signal transmission channel of the TL frame, the first device sets by itself assigning one of the signal transmission channels, which are ensured by the first device and are unused, to the connection and transmitting the audio signal of the source through the signal transmission channel to which the connection is assigned.

Then, the first device writes the audio signal (waveform data), which is output from the source related to the connection, in the region of the signal transmission channel assigned to the connection of the TL frame and notifies all devices of the partial network of the audio signal transmission information, which indicates that the audio signal is transmitted through the signal transmission channel.

In addition, when a source of the second device and a sink of the first device are connected to each other, the first device sets by itself finding out a signal transmission channel of the TL frame, in which an audio signal of the source of the second device is written, on the basis of a series of audio signal transmission information received from the second device and receiving the audio signal of the signal transmission channel and inputting it to the sink related to the connection. Then, the first device reads an audio signal from the region of the signal transmission channel, which is indicated by the audio signal transmission information of the TL frame, and supplies it to the sink related to the connection.

Next, the procedure proceeds to FIG. 8. The user connects devices included in the second partial network S2 to the bridge device of the first partial network S1 in the form of a cascade or a loop (S13). In this case, connection to a network I/F card of the bridge device, which is not used for connection in step S11, is performed.

Then, if this connection is made, the connected devices form a transmission path of a TL frame, which circulates between the connected devices, and starts transmission of the TL frame along the transmission path in the TTL mode similar to the case in step S21 (S41).

After step S13, the user sets a partial master in the second partial network S2 to the bridge device (S14). This setting means that the bridge device is set as a word clock source of the second partial network S2. After step S41, the bridge device may be made to start a function as a partial master automatically.

Then, if the designation in step S14 is made, each device connected in step S13 which is operating in the TTL mode reconstructs a transmission path of a TL frame, which circulates between the devices, using the bridge device designated in step S14 as a partial master. This time, transmission of the TL frame is started in the RTL mode, and an operation as the second partial network S2 is started (S51).

Then, similar to the case in steps S32 to S35, the partial master assigns or notifies a signal transmission channel, and each device starts writing and reading of an audio signal into and from the TL frame according to assignment of the signal transmission channel and setting content of the patch (S52 to S55). As a result, in the second partial network S2, transmission and reception of an audio signal and a control signal between devices serving as nodes become possible.

Then, the procedure proceeds to FIG. 9. The user sets, for a bridge device, transmission of an audio signal between two partial networks through the bridge device (S15). That is, one or a plurality of audio signals is selected from a plurality of audio signals (waveform data) written in the TL frame of the first partial network S1, and transmission of the selected audio signal from the first partial network S1 to the second partial network S2 is set. On the contrary, one or a plurality of audio signals is selected from a plurality of audio signals written in the TL frame of the second partial network S2, and transmission of the selected audio signal from the second partial network S2 to the first partial network S1 is set.

Here, the audio signal written in the TL frame of each partial network is specified by the audio signal transmission information received from each device of the partial network. The user selects an audio signal, which is to be transmitted, from the audio signals which are specified and displayed on the indicator of the console.

Then, if this setting is done, the set bridge device assigns one of the signal transmission channels, which are ensured by the bridge device and are unused, of the TL frame of the partial network as a transmission destination for the transmission for each set transmission (S61). Then, an audio signal related to transmission is read from a region of one signal transmission channel of the TL frame of the partial network of a transmission source, which is specified by the audio signal transmission information, and a transmission operation of writing the audio signal into the region of the signal transmission channel, which is assigned for transmission, of the TL frame of the partial network of the transmission destination is started (S62).

Here, reading of the audio signal from the TL frame is performed by a network I/F card belonging to the partial network of the transmission source, between two network I/F cards of the bridge device, and the read audio signal is supplied to the other network I/F card through the audio bus 217. In addition, writing of the audio signal to the TL frame is performed by the other network I/F card belonging to the partial network of the transmission destination.

Then, for a plurality of audio signals related to transmission, the audio signal transmission information indicating that these audio signals are transmitted through a plurality of signal transmission channels is transmitted to each device of the partial network of the transmission destination (S63). The transmitted audio signal transmission information indicates that the transmitted audio signal is an audio signal output from which source of which device of which partial network.

Accordingly, each device of the partial network of the transmission destination can supply a source of the partial network of the transmission source to the user as one candidate source in setting of the patch described previously, on the basis of the audio signal transmission information.

If the user set a patch between a source of another partial network and a sink of a partial network of the transmission destination in the partial network of the transmission destination, a device to which the sink belongs sets by itself, on the basis of the audio signal transmission information from a bridge device that performs transmission, finding out a signal transmission channel in which the audio signal from the source is written from the TL frame of the partial network of the transmission destination to which the device belongs and receiving the signal transmission channel and inputting it to the sink. Then, the device to which the sink belongs reads the audio signal from the region of the signal transmission channel, which is indicated by the audio signal transmission information of the TL frame, and supplies it to the sink.

Then, each network I/F of the bridge device performs reading and writing started in step S62 in each sampling period, so that the audio signal transmitted through the partial network of the transmission source can be transmitted to the partial network of the transmission destination and the device belonging to the partial network of the transmission destination can read it arbitrarily.

This transmission may be arbitrarily set in both a direction from the first partial network S1 to the second partial network S2 and a direction from the second partial network S2 to the first partial network S1, may be performed in only one of these directions or may be performed in both directions in parallel.

Moreover, although not shown in the drawing, after step S63, the user may set a patch, which is supplied to an appropriate input channel or an output terminal of a device, for each device by reading from a TL frame desired one or the plurality of audio signals transmitted through the bridge device so that the audio signal can be read into the device which actually belongs to the partial network of the transmission destination.

3. Transmission Control of a Word Clock

Meanwhile, the characteristic point in the audio network system S described above lies in, in particular, the operation of the bridge device of each device which even if a word clock source of the entire system is changed to another device while the system is operating with a certain device as the word clock source of the entire system, makes it possible to quickly supply a timing of a word clock from the changed device to all devices in the system.

Therefore, this point will be described below.

3.1 Generation of a Word Clock

First, how a word clock is supplied in each device included in the audio network system S will be described.

Figure 10:
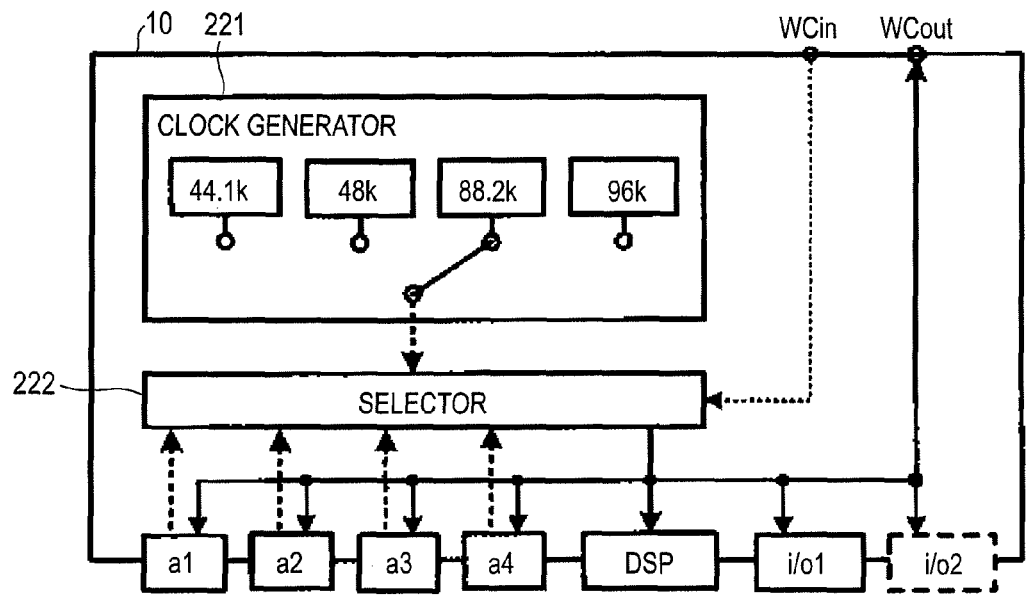
FIG. 10 is a view schematically showing a supply state of a word clock in an audio signal processor serving as a word clock source of the entire system.

FIG. 10 schematically shows a supply state of a word clock in the audio signal processor 10 serving as a word clock source of the entire system.

In FIG. 10, a clock generator 221 is a clock generating means for generating a clock signal with a desired frequency by performing frequency division of an output signal of a predetermined oscillator using a PLL (phase locked loop) circuit, for example. Here, clock signals with four frequencies of 44.1 kHz, 48 kHz, 88.2 kHz, and 96 kHz can be generated, and any one of them can be selected and output.

In addition, WCin is a terminal to which a clock signal from an external clock supply device of the audio network system S is input. In addition, WCout is a terminal from which a clock signal is output to an external device of the audio network system S.

In addition, a1 to a4 indicate digital or analog audio input terminals (input ports) or audio output terminals (output ports) of cards connected to the card I/O 210. DSP indicates a DSP card connected to the card I/O 210. i/o1 and i/o2 indicate network I/F cards similarly. If the audio signal processor 10 is a bridge device, two network I/F cards are mounted. If the audio signal processor 10 is a device other than the bridge device, only one network I/F card is mounted, and therefore i/o2 indicated by a dotted line does not exist.

In addition, arrows indicated by dotted lines are candidate examples of a word clock supply source. That is, the candidate examples include a clock generated by the internal clock generator 221, a clock supplied from an external clock supply device, and a transmission clock of a digital audio signal supplied to a digital input terminal. All of them are means for supplying a clock of independent timing since they are not influenced by the operation of another device included in the audio network system S.

A selector 222 selects any of the candidates. The clock selected by the selector 222 is used as a word clock as a reference of operation timing of each device included in the audio network system S and is also supplied to each section of the audio signal processor 10 as indicated by the solid line. In particular, in the network I/F card, transmission of a TL frame is performed in synchronization with a timing of the word clock.

However, even in a solid-line path, supply of a selected word clock to the supplier is meaningless because there is no purpose in using the word clock. Similarly, supply to the network I/F card under slave operation is also meaningless. Even if these supply operations are performed, there is no operation of the word clock.

In addition, the word clock may be supplied to each section of the audio signal processor 10 after shifting the phase. For example, as disclosed in JP-A-2008-72363, in the DSP card, it is preferable to use a word clock for signal processing obtained by delaying a word clock for transmission, which is used in determination of a transmission timing of a TL frame in the network I/F card, by predetermined target delay Dt.

In addition, the audio signal processor 10 does not need to include all of the sections shown in FIG. 10. At least, if one supply source (may be a supply source other than those shown in the drawing) of a word clock at an independent timing is provided in addition to the network I/F card, the function as a word clock source (or a temporary word clock source, which will be described later, in a bridge device) of the entire system can be realized.

Figure 11:
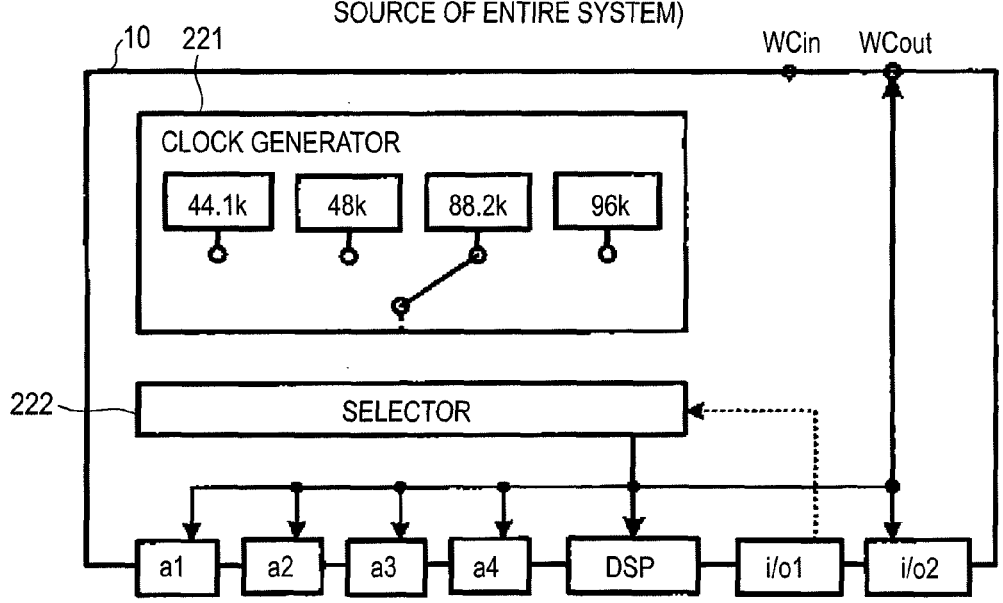
FIG. 11 is a view schematically showing a supply state of a word clock in an audio signal processor which becomes a device other than a word clock source of the entire system.

Next, FIG. 11 shows a supply state of a word clock in the audio signal processor 10, which becomes a device other than the word clock source of the entire system, similar to FIG. 10.

As can be seen from FIG. 11, in devices other than the word clock source of the entire system, a word clock supply source is a network I/F card. That is, a word clock is generated on the basis of a receiving timing of a TL frame in the network I/F card.

A TL frame transmitted from a device of a word clock source always circulates through a transmission path at almost the same speed. Accordingly, each device on the transmission path receives the TL frame at the same period as the word clock in the device of the word clock source. Therefore, if the period is adjusted by inputting the receiving timing to a PLL or the like, it is possible to generate a word clock with the same period as that in the device of the word clock source.

That is, a word clock from the word clock source of the entire system is transmitted to each device of the partial network through the partial network.

Moreover, as disclosed in JP-A-2008-72363, by calculating a time until each device receives a TL frame after the partial master transmits the TL frame on the basis of a signal receiving and transmission timing of the TL frame in the partial master or a signal receiving timing of the TL frame in each device and delaying a word clock based on the signal receiving timing of the TL frame by an appropriate time in consideration of the time, it is possible to obtain a word clock for signal processing with the same phase as a word clock for signal processing in the device of the word clock source.

In addition, in order for a bridge device to perform an operation as a device (audio signal bridge) which bridges an audio signal, that is, to transmit an audio signal through the bridge device, the bridge device should operate as a partial master at least in one of the two partial networks to which it is connected. Moreover, when the bridge device operates as a slave in another partial network as shown in FIG. 11, a word clock is generated on the basis of a signal receiving timing of a TL frame in the partial network and a signal transmission timing of a TL frame in the partial network serving as the partial master is determined on the basis of the generated word clock.

In this way, the word clock transmitted from the word clock source of the entire system through one partial network is transmitted to another partial network through the bridge device.

Moreover, in this case, the bridge device may generate a word clock for signal transmission with the same phase as the word clock for signal transmission in the device of the word clock source by delaying a word clock generated on the basis of the receiving timing of the TL frame by an appropriate time similar to the case of the word clock for signal processing described above, and the generated word clock may be used as a reference of the signal transmission timing of the TL frame.

In this manner, also in a device belonging to a different partial network from the word clock source of the entire system, a word clock for signal processing with the same phase as the word clock for signal processing in the device of the word clock source of the entire system can be obtained using the same method as in the device belonging to the same partial network as the word clock source of the entire system.

Moreover, the bridge device can perform an operation as an audio signal bridge also when it serves as a partial master in both of the two partial networks to which the bridge device is connected. In this case, the same word clock timing can be transmitted to both the partial networks by controlling the signal transmission timing of TL frames in both the partial networks on the basis of the same word clock selected by the selector 222 as shown in FIG. 10.

In any case, the requirement for the bridge device to operate as an audio signal bridge is that periods of TL frames of the two partial networks should be equal.

3.2 Operation Corresponding to Setting of a Partial Master

Next, processing when setting of a partial master has been performed will be described. This processing may be the same in the case where the processing is performed as setting of the word clock source of the entire system in step S12 of FIG. 7, in the case where the processing is performed as setting of the word clock source of the partial network in step S14 of FIG. 8, and in the case where the processing is performed as setting of changing the word clock source of the entire system to another device after the audio network system S starts an operation. Moreover, also in the case where the word clock source of the partial network is automatically set, the same processing may be performed.

In the present embodiment, an operation mode switching (OM) command is prepared as a command for setting a partial master and a network I/F card which receives the command sets a device, in which the card is mounted, as a partial master in the partial network and starts an operation as a master. Moreover, when the device generates a word clock at an independent timing, the device also serves as a word clock source of the entire system simultaneously.

When there is a user's operation of setting a partial master, a device which has received the setting operation generates the OM command, and it is transmitted as an ITL frame to the address of a network I/F card, which needs to execute an operation as a master, of the device set as the partial master. A device included in the network system S may automatically generate and transmit the OM command.

In any case, since the OM command is an ITL frame, it is transmitted to only an adjacent device regardless of the destination of the command. Moreover, it is preferable that the OM command is transmitted from a signal transmission I/F at the side where a device of the destination is present, between two signal transmission I/Fs included in the network I/F card 215, on the basis of the information on the connection topology of the device connected when forming a transmission path of a TL frame.

Figure 12:
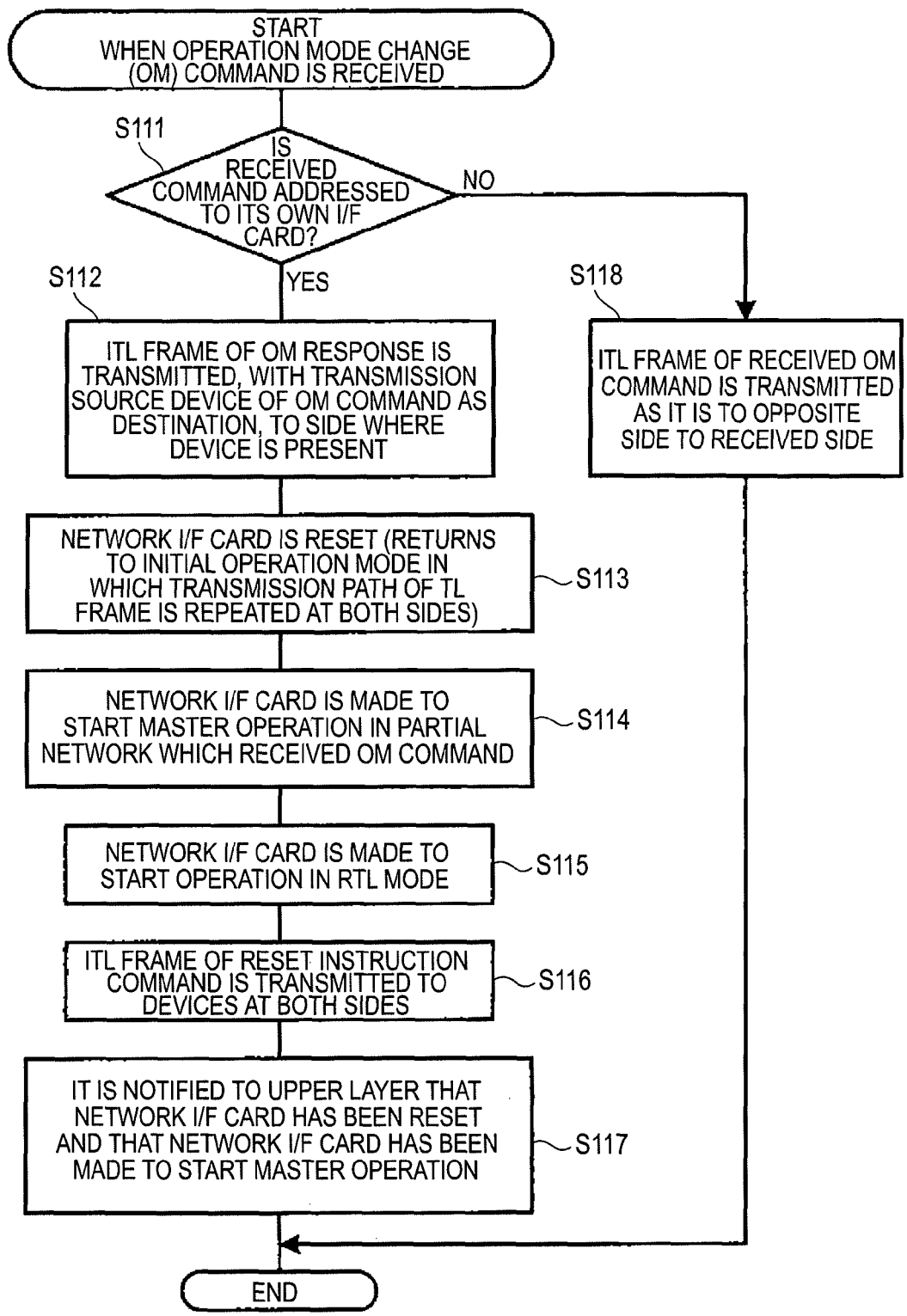
FIG. 12 shows a flow chart of processing, which is executed by a CPU of a network I/F card, when the network I/F card of the audio signal processor receives an OM command.

Here, FIG. 12 shows a flow chart of processing, which is executed by a CPU of the network I/F card 215, when the network I/F card 215 of each audio signal processor 10 receives an OM command. In addition, this processing is performed for every network I/F card in a device which has a plurality of network I/F cards like a bridge device. That is, the "network I/F card 215" in the following explanation is a network I/F card which receives an OM command.

In the processing shown in FIG. 12, first, the CPU of the network I/F card 215 determines whether or not the received OM command is addressed to the network I/F card 215 (S111). If the received OM command is not addressed to the network I/F card 215, the ITL frame of the received OM command is transmitted as it is to the opposite side to the received side (S118), and the process ends. Until the OM command reaches a network I/F card of the destination, network I/F cards of intermediate devices mediate transmission of the ITL frame in a sequential manner.

In addition, this mediation is necessary when the circulation of a TL frame has not started yet in one partial network. After the circulation of a IL frame has started (under the RTL or TTL operation), the OM command can be transmitted to all devices of the partial network by transmitting the OM command in the Ethernet region of the TL frame. Accordingly, mediation in the same partial network is not necessary. In addition, when the device is a bridge device, the OM command received in one partial network is transmitted to another partial network regardless of whether or not the TL frame is circulating.

On the other hand, if the OM command is addressed to the network I/F card 215 in step S111, an ITL frame of an OM response which is a response to the OM command is transmitted, with a transmission source device which first transmitted the OM command as the destination, to the side where the device is present (S112). Then, the network I/F card 215 is reset to return to an initial operation mode in which the transmission path of the TL frame is repeated at both sides (S113). As a result, the network I/F card 215 is once separated from the transmission path in the TTL mode or the RTL mode.

Then, the network I/F card 215 is made to start a master operation in the partial network which received the OM command (S114). This means that the audio signal processor 10 mounted with the network I/F card 215 has become a partial master in the partial network.

Then, an operation in the RTL mode is started by the network I/F card 215 (S115), and the ITL frame of a reset instruction command is transmitted to the devices at both sides (S116). In addition, it is notified to the CPU 201, which performs processing of an upper layer than the network I/F card 215 corresponding to a data link layer, that the network I/F card 215 has been reset and that the network I/F card 215 has been made to start a master operation (S117), and the process ends.

Figure 13:
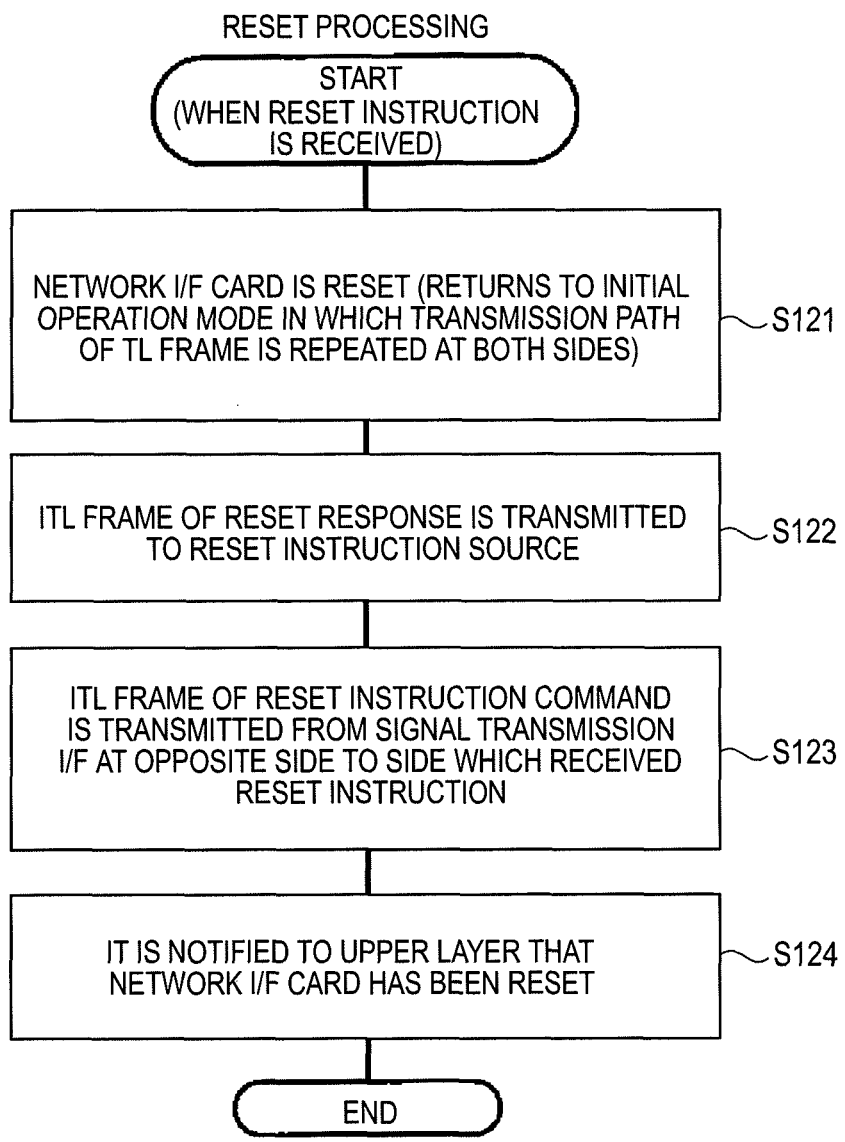
FIG. 13 shows a flowchart of processing when the network I/F card of the audio signal processor receives a reset instruction command.

Next, FIG. 13 shows a flow chart of processing, which is executed by the CPU of the network I/F card 215, when the network I/F card 215 of each audio signal processor receives a reset instruction command transmitted in step S116 of FIG. 12. This processing is also performed for every network I/F card similar to the case shown in FIG. 12.

In the processing shown in FIG. 13, first, the CPU resets the network I/F card 215 similar to the case in step S113 shown in FIG. 12 (S121). Then, an ITL frame of a reset response which is a response to the command is transmitted to the transmission source of the reset instruction command (S122).

Then, the ITL frame of the reset instruction command is transmitted from a signal transmission I/F at the opposite side to the side which received the reset instruction command (S123), and it is notified to the CPU 201, which performs processing of an upper layer, that the network I/F card 215 has been reset (S124), and the process ends.

Moreover, also in the network I/F card 215 of the adjacent device which received the reset instruction command transmitted in the processing of step S123, the CPU similarly performs the processing shown in FIG. 13. In addition, this chain operation continues until all network I/F cards 215 of the partial network are reset.

Accordingly, in the partial network to which the network I/F card 215 that performed the processing shown in FIG. 12 is connected, network I/F cards of all of the other devices are sequentially reset. This is called "reset" of a partial network.

Thereafter or in parallel to the chain operation of resetting, a transmission path of the TL frame in the RTL mode is reconstructed with the audio signal processor 10, in which the network I/F card 215 which performed the processing shown in FIG. 12 is mounted, as a partial master. As a result, transmission and reception of an audio signal and a control signal between devices included in the partial network become possible again through the same procedure as in steps S31 to S35 shown in FIG. 7.

Moreover, in the case where the processing shown in FIG. 12 is executed once the audio network system S started the operation, the setting content of patch or assignment of a signal transmission channel and the setting content of transmission of one or a plurality of audio signals through a bridge device may also be stored in the case of resetting so that each device can operate according to the same setting content as before the resetting after reconstruction of a transmission path.

3.3 Operation of a Bridge Device.

Next, processing will be described which a bridge device executes so that even when a word clock source of the entire system is changed to another device by the above-described OM command, a timing of a word clock can be quickly supplied from the changed device to each device in the system.

As described above, there are cases of a bridge device, such as a case where the bridge device operates as a slave in one of two partial networks bridged by itself and operates as a master in the other partial network, a case where the bridge device operates as a master in both of the two partial networks, and a case where the bridge device is connected to one partial network by only one of two network I/Fs and performs a master operation or a slave operation there.

Figure 14:
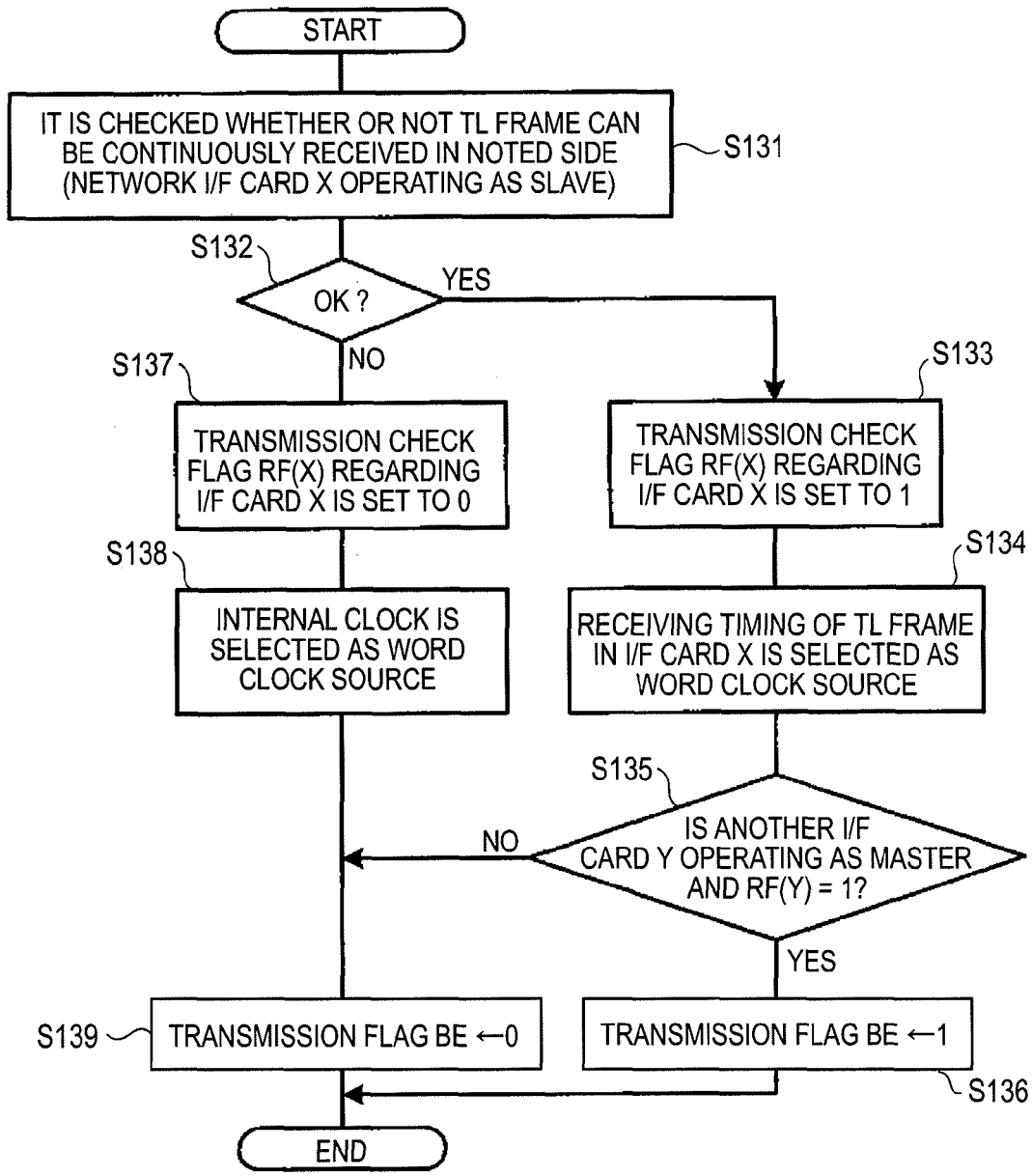
FIG. 14 shows a flow chart of processing that a CPU of a bridge device performs periodically for a network I/F card which operates as a slave in a partial network.
Figure 15:
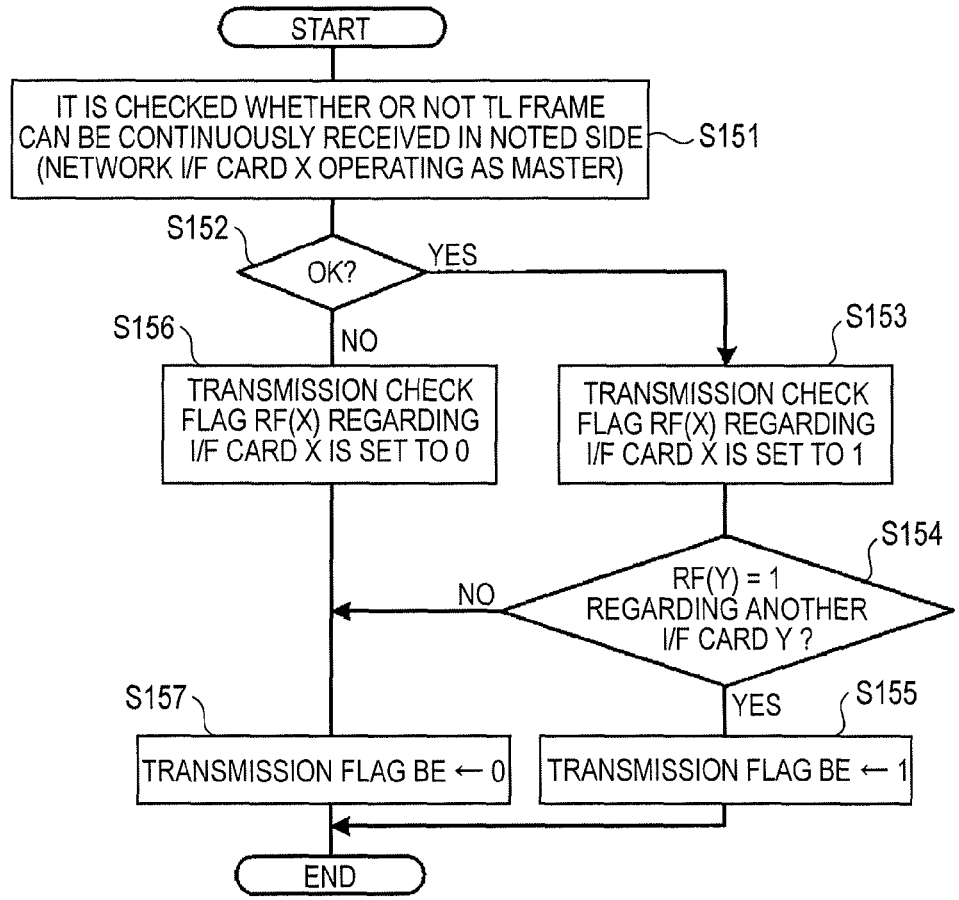
FIG. 15 shows a flow chart of processing that the CPU performs periodically for a network I/F card operating as a master.

In all of the cases, according to whether each network I/F operates as a slave or a master, the CPU 201 performs processing shown in the flow charts of FIGS. 14 and 15 periodically as processing corresponding to the upper layer of transmission of a TL frame by the network I/F card 215.

The processing shown in FIG. 14 is processing performed for a network I/F card operating as a slave in a partial network, and the processing shown in FIG. 15 is processing performed for a network I/F card operating as a master similarly. It is not necessary to perform the processing for a network I/F card which performs neither of the operations (which is not connected to another device and does not belong to the partial network either).

Figure 17:
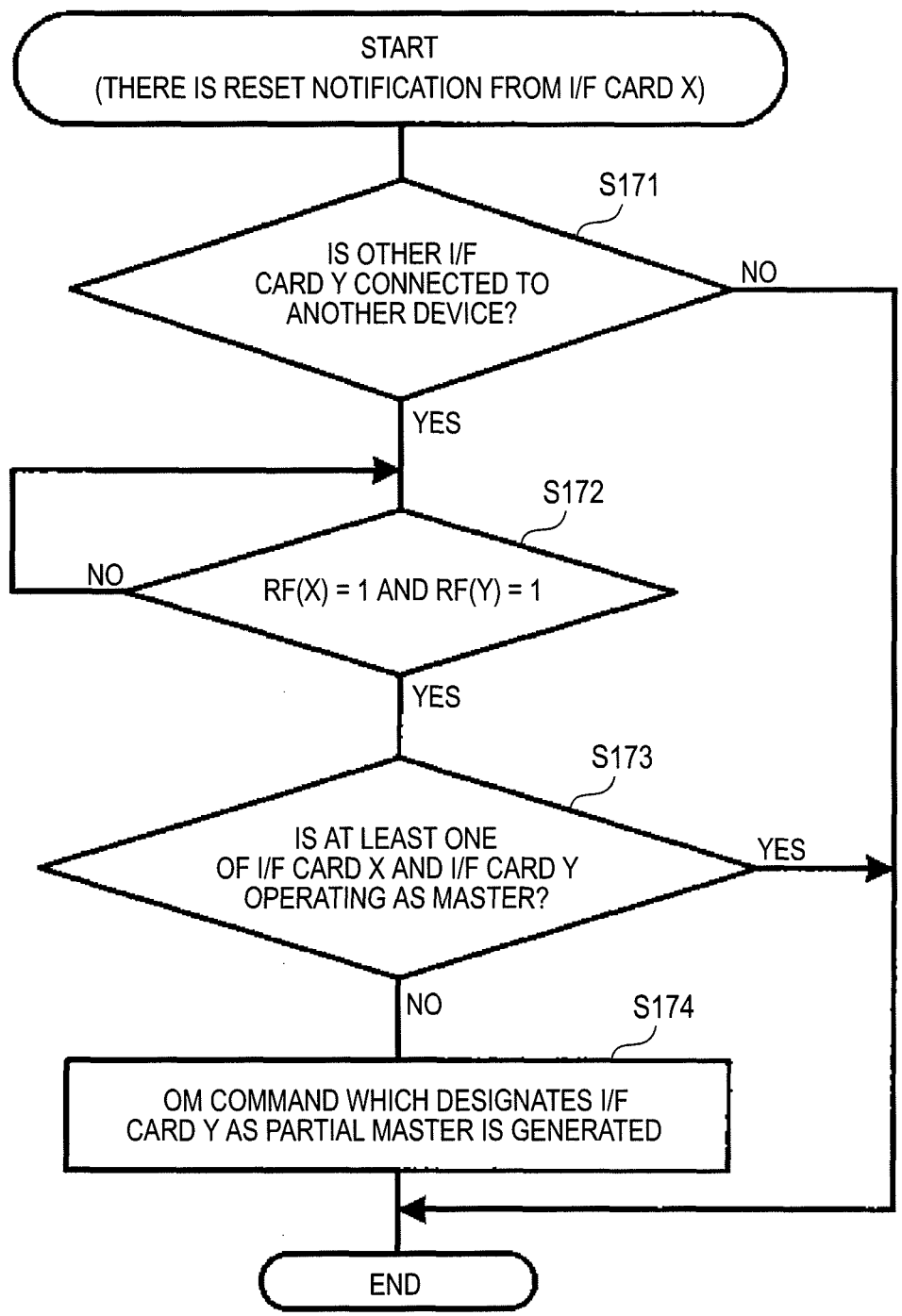
FIG. 17 shows a flow chart of processing executed when a CPU of a bridge device receives a notification of resetting from a network I/F card.

First, in the processing shown in FIG. 14, the CPU 201 checks whether or not a TL frame can be continuously received in a noted network I/F card under slave operation (referred to as X: which network I/F card is to be X is determined at the start of processing and the same is true in FIGS. 15 and 17) (S131). This is processing for mainly checking that a partial network has not been reset. Accordingly, even if signal reception is stopped for about several sampling periods like the case where one place of a partial network of loop connection is disconnected and the network is changed to cascade connection, it can be treated as "continuous signal reception".

Then, if it can be continuously received (YES in S132), a transmission check flag RF(X) regarding a network I/F card X is set to "1" indicating that transmission of a TL frame in the network I/F card is performed normally (S133). Then, a receiving timing of the TL frame in the network I/F card X is selected as a word clock source in a bridge device (S134). If this selection is already made, the selection is maintained.

Accordingly, the other network I/F card (referred to as Y) which performs a master operation can transmit a TL frame at a timing synchronized with a word clock in a partial network, in which a bridge device operates as a slave, and can transmit a timing of the word clock to a partial network in which the bridge device operates as a master.

Then, the CPU 201 determines whether or not the other network I/F card Y is operating as a master and whether or not a value of a transmission check flag RF(Y) regarding the card Y is "1" (S135). Moreover, if there is a notification from the corresponding card which is performed in step S117 shown in FIG. 12 and then there is no notification that the card has been reset, the CPU 201 determines that the card is operating as a master.

If YES in step S135, it can be seen, together with the determination in step S132, that a TL frame is normally transmitted and transmission of the above-described word clock timing is also performed correctly in both the two partial networks to which the bridge device is connected. Accordingly, since it can be determined that transmissions of a TL frames in two partial networks synchronize with each other and transmission of an audio signal through the bridge device may be performed, a transmission flag BE is set to "1" indicating that transmission of an audio signal through the bridge device is performed (S136), and the process ends.

On the other hand, if NO in step S135, it is determined that transmission of an audio signal through the bridge device is not performed normally since it can be seen that transmissions of a TL frame in two partial networks do not synchronize with each other. Therefore, the transmission flag BE is set to "0" indicating that transmission of an audio signal through the bridge device is not performed (S139), and the process ends.

In addition, if NO in step S102, the CPU 201 set the transmission check flag RF(X) to "0" indicating that transmission of a TL frame is not performed normally (S137). In this case, a signal receiving timing of a TL frame in the network I/F card X cannot be used as a word clock source. Accordingly, an internal clock (supply source other than the signal receiving timing of the TL frame in the network I/F card X) is selected as a word clock source in a bridge device (S138). If this selection is already made, the selection is maintained.

Also in this case, since it can be seen that transmissions of a TL frame in two partial networks do not synchronize with each other (since transmission of a TL frame is not performed in the network I/F card X), the transmission flag BE is set to "0" indicating that the partial network does not perform audio transmission (S136), and the process ends.

Then, in the processing shown in FIG. 15, the CPU 201 checks whether or not a noted network I/F card (referred to as X) under slave operation can continuously receive a TL frame, similar to the case in step S131 shown in FIG. 14 (S151).

Then, if it can be continuously received (YES in S152), the transmission check flag RF(X) regarding the network I/F card X is set to "1" indicating that transmission of a TL frame is performed normally (S153).

Then, the CPU 201 determines whether or not a value of the transmission check flag RF (Y) regarding the other network I/F card Y is "1" (S154). If YES, it can be seen, together with the determination in step S152, that a TL frame is normally transmitted and transmission of the above-described word clock timing is also performed correctly in both the two partial networks to which the bridge device is connected (under these conditions, determination in step S135 shown in FIG. 14 is YES). Accordingly, since it can be determined that transmissions of a TL frame in two partial networks synchronize with each other and transmission of an audio signal through the bridge device may be performed, the transmission flag BE is set to "1" (S155), and the process ends.

On the other hand, if NO in step S154, it can be seen that transmissions of a TL frame in two partial networks do not synchronize with each other, it is determined that transmission of an audio signal through the bridge device is not performed normally. Therefore, the transmission flag BE is set to "0" (S157), and the process ends.

In addition, if NO in step S152, the CPU 201 sets the transmission check flag RF(X) to "0" indicating that transmission of a TL frame is not performed normally (S156). Also in this case, since it can be seen that transmissions of a TL frame in two partial networks do not synchronize with each other (since transmission of a TL frame is not performed in the network I/F card X), the transmission flag BE is set to "0" (S157), and the process ends.

In addition, a word clock source in a bridge device is an internal clock or a signal receiving timing of a TL frame in a network I/F card operating as a slave. Accordingly, even if there is no reception of a TL frame in a network I/F card operating as a master, there is no particular influence on the word clock source. For this reason, processing of selecting a word clock source is not included in the processing shown in FIG. 15.

Through the above-described processing in FIGS. 14 and 15, the CPU 201 can set the values of the transmission check flag RF and the transmission flag BE of each network I/F according to the situation of a partial network to which each network I/F belongs.

Figure 16:
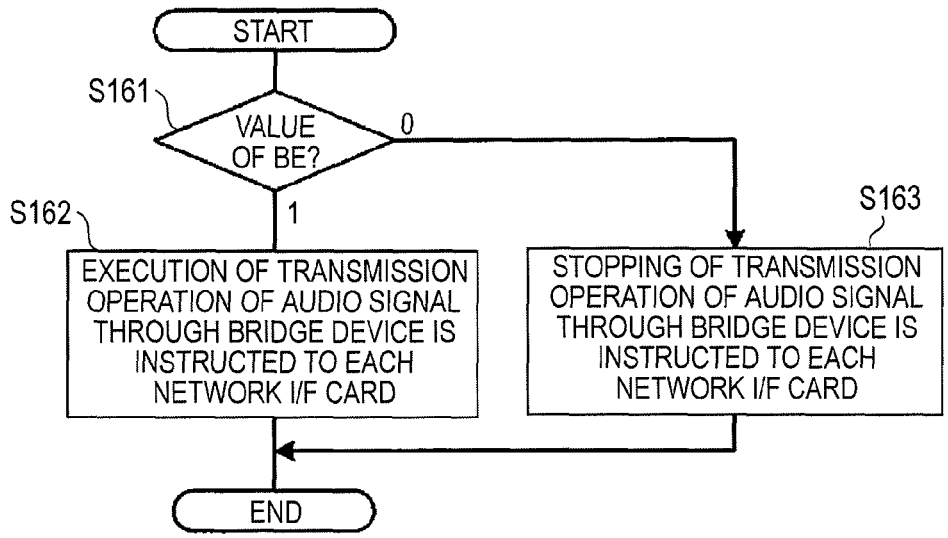
FIG. 16 shows a flow chart of processing regarding control of transmission of an audio signal through a bridge device, which is periodically executed by a CPU of a bridge device.

Next, FIG. 16 shows a flowchart of processing regarding control of transmission of an audio signal through a bridge device, which is periodically executed by the CPU 201 of the bridge device.

In this processing, the CPU 201 refers to the value of the transmission flag BE (S161). If the value is "1", execution of a transmission operation of an audio signal through a bridge device is instructed to two network I/F cards (S162). If the value is "0", stopping of the transmission operation of the audio signal through the bridge device is instructed to two network I/F cards (S163).

In response to the start instruction in step S162, the two network I/F cards start the transmission processing described above. Moreover, in response to the stop instruction in step S163, each network I/F card stops writing of an audio signal into a signal transmission channel of a TL frame regarding transmission, in which a partial network to which the network I/F card belongs becomes a transmission destination, of set transmissions and also notifies all devices of the partial network, to which it belongs, of the audio signal transmission information indicating that transmission of the audio signal through the signal transmission channel has been stopped. If there is a device which receives an audio signal of the signal transmission channel through which signal transmission is stopped, the device stops receiving the audio signal of the signal transmission channel through which signal transmission is stopped according to the notified audio signal transmission information.

Through the processing described above, transmission of an audio signal through a bridge device can be performed under the conditions in which transmissions of a TL frame in two partial networks synchronize with each other.

Next, FIG. 17 shows a flow chart of processing executed when the CPU 201 of a bridge device receives a notification of resetting from a network I/F card.

When the CPU 201 receives from one network I/F card (assumed to be X) a notification that the network I/F card has been reset through the processing in step S117 of FIG. 12 or step S124 of FIG. 13, the CPU 201 starts the processing shown in FIG. 17.

In this processing, first, the CPU 201 determines whether or not a network I/F card (assumed to be Y), which is not X, is connected to another device, that is, whether or not the network I/F card Y belongs to the partial network (S171). If NO, it is not necessary to take into consideration the transmission of a word clock timing through a bridge device. Accordingly, the processing ends.

However, if YES, the CPU 201 waits until the transmission check flag RF is set to "1" in both the network I/F cards X and Y taking into consideration the transmission of a word clock timing (S172). When the network I/F card X is reset, the transmission check flag RF (X) should be set to "0" in step S137 of FIG. 14 or step S156 of FIG. 15 according to whether the card X is operating as a slave or a master. Then, a transmission path of a TL frame in the partial network is reconstructed after resetting and transmission of the TL frame is resumed, and setting of RF (X) to "1" is waited. Although both network I/F cards may be reset almost simultaneously, resumption of transmission of a TL frame in both partial networks is waited in this case.

In addition, if at least one of the network I/F cards X and Y performs a master operation in a state where transmission of a TL frame has been resumed (YES in S173), the CPU 201 determines that transmission of a word clock timing is performed normally and ends the processing.

If the network I/F card X performs a slave operation, that is, if a word clock source of the entire system is present in a partial network to which the card X belongs, the other network I/F card Y should continue the master operation in the case of a normal state. Accordingly, even if any of the slave operation and the master operation is performed after the card X is reset, the determination in step S173 is YES. Moreover, in this case, transmission of a timing of a word clock is continued in the same manner as before resetting.

However, when both the network I/F cards X and Y operate as slaves in step S173, transmission of a word clock timing through a bridge device cannot be performed as it is. Therefore, an OM command for designating the network I/F card Y as a partial master in a partial network, to which the card Y is connected, is generated (S174), and the process ends.

Such a situation occurs when another device of a partial network to which the card X belongs become a partial master in a state where only the network I/F card X performs a master operation and the network I/F card Y performs a slave operation. This is because the card X starts a slave operation when continuous reception of TL frames transmitted from the partial master is started, and therefore both the network I/F cards X and Y perform slave operations.

In this case, the network I/F card Y which has been performing a slave operation till then executes the processing shown in FIG. 12 in response to the OM command, thereby resetting the connected partial network to start a master operation. Thereafter, the timing of a word clock can be transmitted from the partial network, to which the network I/F card X belongs, to the partial network, to which the network I/F card Y belongs.

Moreover, in this case, the transmission direction of a word clock is an opposite direction to that before the network I/F card X is reset.

In addition, since resetting is also included in the processing shown in FIG. 12, the CPU 201 executes the processing shown in FIG. 17 again, according to the resetting, with a card, which was the network I/F card Y in the last processing, as the network I/F card X. In this processing, determination in step S173 is YES. Accordingly, another OM command is not generated.

Through the processing described above, even if a device as a word clock source moves from one partial network to which the device belongs to another partial network, the bridge device can continue transmission by appropriately changing the transmission direction of a word clock timing through a bridge device according to the movement.

3.4 Specific Example of an Operation when a Word Clock Source is Changed

Next, the behavior of a bridge device and the entire system based on the processing described above when a word clock source of the entire system is changed in an audio network system will be described with reference to FIGS. 18 to 19.

Moreover, an explanation herein will be made using an audio network system, which is more complicated than that shown in FIG. 1 and includes four partial networks (here, called rings 1 to 4) as an example.

Figure 18:
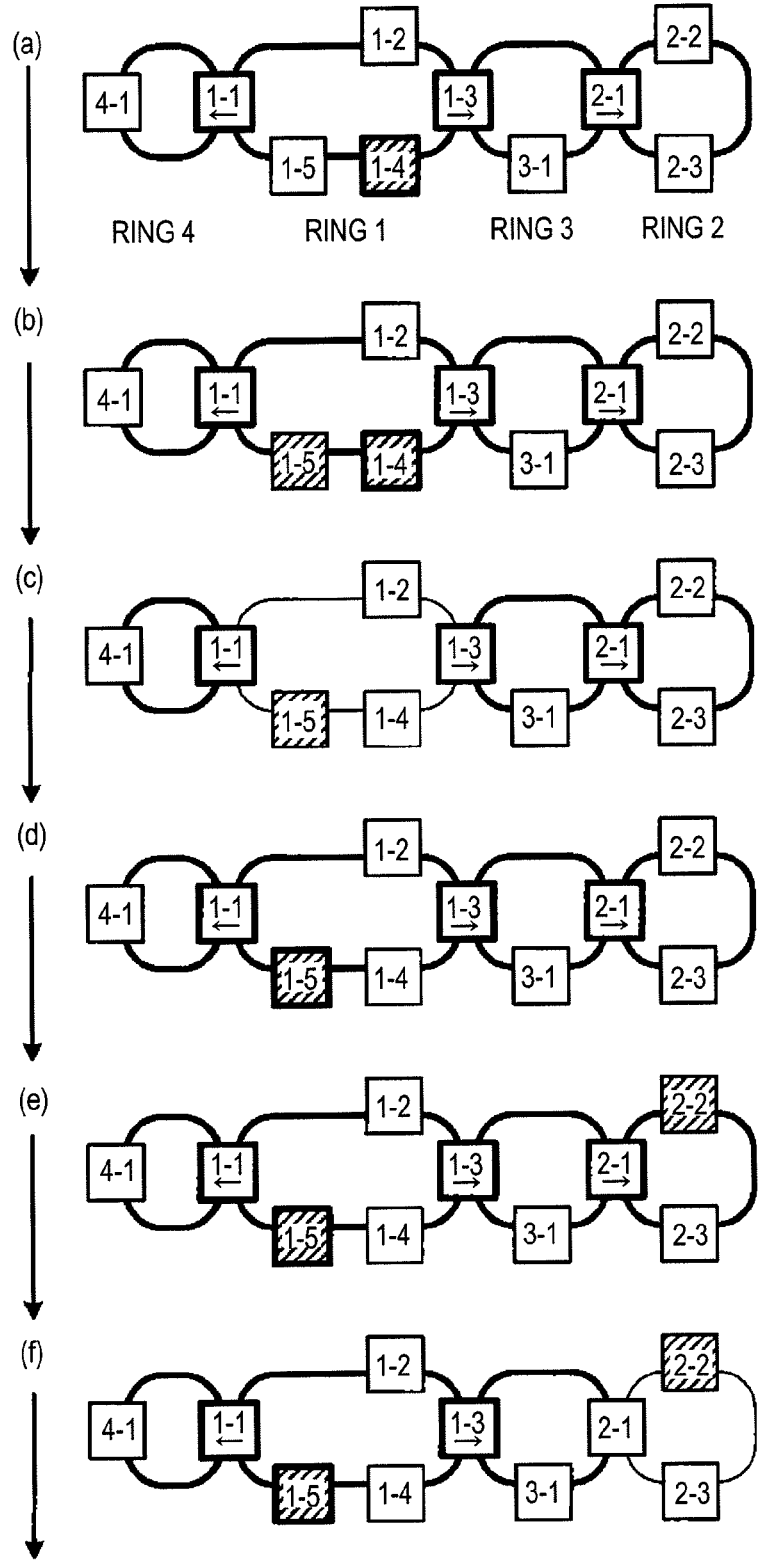
FIG. 18 is a view for explaining the behavior of a bridge device and the entire system when a word clock source of the entire system is changed in the audio network system.

As shown in A of FIG. 18, the audio network system is formed by connecting ten devices "1-1" to "4-1" to each other. Among them, the devices "1-1", "1-3", and "2-1" connected to two rings are bridge devices. Moreover, an arrow shown in a box of each bridge device indicates the transmission direction of word clock timing. A ring at the root side of the arrow is a transmission source, and a ring at the distal side of the arrow is a transmission destination.

In addition, each device indicated by a heavy line is a partial master of each ring. A hatched device is a device serving as a word clock source of the entire system. Each ring indicated by a bold letter is a ring which performs periodical transmission of a TL frame, and a ring indicated by a thin line is a ring which reconstructs a transmission path of a TL frame after resetting.

In a state shown in A of FIG. 18, the device 1-4 is a word clock source of the entire system and operates as a partial master in the ring 1. In addition, the bridge device 1-3 operates as a slave in the ring 1 and as a master in the ring 3, and transmits a timing of a word clock from the ring 1 to the ring 3. In addition, the bridge device 2-1 operates as a slave in the ring 3 and as a master in the ring 2, and transmits a timing of a word clock from the ring 3 to the ring 2. The bridge device 1-1 operates as a slave in the ring 1 and as a master in the ring 4, and transmits a timing of a word clock from the ring 1 to the ring 4.

By each bridge device described above, a timing of a word clock that the device 1-4 generates on the basis of an internal clock is transmitted to all rings. In this state, word clocks of all rings synchronize with each other, and the bridge devices 1-1, 1-3, and 2-1 execute transmission of an audio signal through the bridge devices.

In this state, the behavior of the system when the device 1-5 of the same ring as the device 1-4 is set as a new word clock source of the entire system as shown in B of FIG. 18 is considered.

In this case, first, the device 1-5 detects an OM command and performs the processing from step S112 in FIG. 12 to reset a network I/F card. At this point of time, the device 1-4 continues an operation as a word clock source because the device 1-4 has not been reset yet. However, since the device 1-5 transmits a reset command to the neighboring devices 1-4 and 1-1 and the reset command propagates through the entire ring 1 sequentially by the processing shown in FIG. 13, all devices (only network I/F cards connected to the ring 1 for the bridge devices) belonging to the ring 1 are reset as shown in C of FIG. 18. As a result, the ring 1 is disassembled.

In this state, in the bridge devices 1-1 and 1-3, reception of a TL frame in network I/F cards under slave operation is stopped. Accordingly, since determination in step S132 of FIG. 14 is NO, the word clock source is changed to an internal clock and a transmission timing of an TL frame in the ring operating as a master is determined. By the processing shown in FIG. 16, the bridge devices 1-1 and 1-3 stop transmission of an audio signal through the bridge devices.

In this case, a word clock may be slightly distorted due to change of a word clock source. However, transmission of a TL frame in the ring which is not reset is continued basically satisfactorily.

Then, when transmission of a TL frame in the ring 1 is resumed using the device 1-5 as a partial master as shown in D of FIG. 18, the bridge devices 1-1 and 1-3 return to a state where reception of a TL frame in the network I/F cards under slave operation can be performed normally. Accordingly, determination in step S132 shown in FIG. 14 is YES, and a signal receiving timing of a TL frame in the network I/F card connected to the ring 1 is set again as a word clock source.

As a result, the timing of the word clock of the ring 1 returns to a state transmitted to the rings 3 and 4. In addition, each of the bridge devices 1-1 and 1-3 resumes transmission of an audio signal through the bridge device by the processing shown in FIG. 16.

Then, each of the bridge devices 1-1 and 1-3 executes the processing shown in FIG. 17 according to the resetting, and the process proceeds to step S173 at the point of time when reception of a TL frame in the ring 1 is restored. However, since a network I/F card connected to the ring 4 or the ring 3 is under master operation, the process ends.

During the state shown in A to D of FIG. 18, there is no particular change in the transmission situation of a TL frame in the ring 3. Accordingly, the device 2-1 does not recognize that the ring 1 was disassembled and reconstructed unless the information is additionally transmitted.

Next, the behavior of the system when the device 2-2 of a ring, which is different from that of the device 1-5, is set as a word clock source of the entire system as shown in E of FIG. 18 is considered.

In this case, first, the device 2-2 detects an OM command and performs the processing from step S112 in FIG. 12 to reset itself. At this point of time, since the bridge device 2-1 of the same ring has not been reset yet, the bridge device 2-1 continues an operation as a partial master. However, since the device 2-2 transmits a reset command to the neighboring devices and the reset command propagates through the entire ring 2 by the processing shown in FIG. 13, all devices (only network I/F cards connected to the ring 2 for the bridge device) belonging to the ring 2 are reset as shown in FIG. 18F. As a result, the ring 2 is disassembled.

In this state, in the bridge device 2-1, reception of a TL frame is stopped in a network I/F card under master operation. Accordingly, determination in step S152 shown in FIG. 15 is NO. However, there is no particular influence in the operation in the ring 3 as a slave. Here, the device 2-1 stops transmission of an audio signal through the bridge device by the processing shown in FIG. 16.

At this point of time, there is no change in the operation of the device 1-5 set as a word clock source of the entire system at the point of time of D of FIG. 18.

Figure 19:
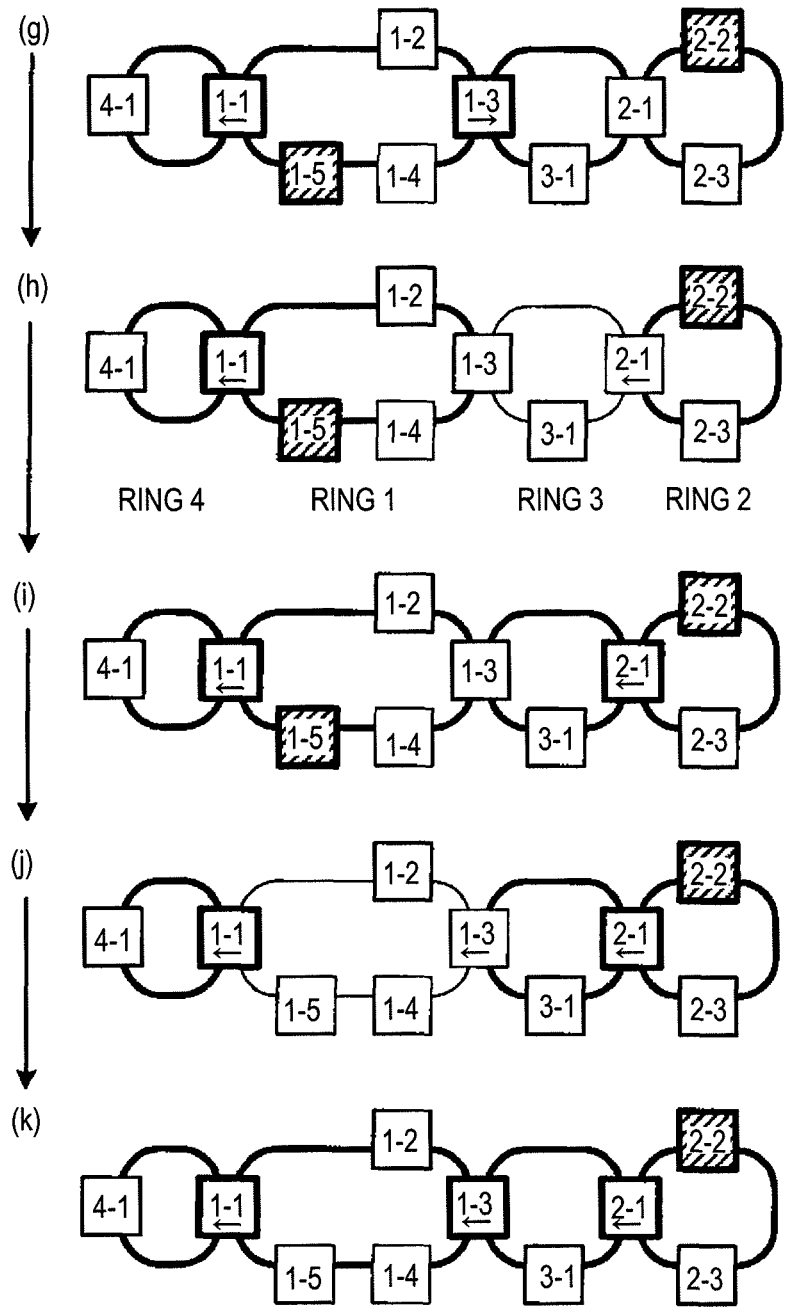
FIG. 19 is a view showing the continuation of FIG. 18.

Then, when transmission of a TL frame in the ring 2 is resumed using the device 2-2 as a partial master as shown in G of FIG. 19, the bridge device 2-1 returns to a state where reception of a TL frame in a network I/F card connected to the ring 2 can be performed normally. Here, the network I/F card connected to the ring 2, which performed a master operation before resetting, performs a slave operation.

Accordingly, the bridge device 2-1 operate as a slave in both the rings 2 and 3, determination in step S173 is NO in the processing shown in FIG. 17 according to the resetting. Therefore, an OM command for setting the network I/F card connected to the ring 3 as a partial master of the ring 3 is generated.

In response to this, the bridge device 2-1 disassembles the ring 3 and starts an operation as a partial master of the ring 3 as shown in H of FIG. 19.

Then, as shown in I of FIG. 19, when a transmission path of a TL frame in the ring 3 is reconstructed, the bridge device 2-1 resumes transmission of an audio signal through the bridge device by the processing shown in FIG. 16. At this point of time, the bridge device 2-1 transmits a timing of a word clock from the ring 2 to the ring 3, that is, in the opposite direction to that before resetting.

Moreover, at the point of time of I of FIG. 19, the bridge device 1-3 operates as a slave in both the ring 3 and the ring 1. Accordingly, in the processing shown in FIG. 17 according to the resetting, an OM command for setting the network I/F card connected to the ring 1 as a partial master of the ring 1 is generated similar to the case of the bridge device 2-1.

In response to this, disassembling of a ring shown in J of FIG. 19 and reconstruction of a ring shown in K of FIG. 19, in which the bridge device 1-3 is set as a partial master, are also performed in the ring 1. At this point of time, the bridge device 1-3 transmits a timing of a word clock from the ring 3 to the ring 1, that is, in the opposite direction to that before resetting. In addition, the bridge device 1-3 temporarily stops transmission of an audio signal through the bridge device until the ring 1 can be reconstructed in K of FIG. 19 after the network I/F card connected to the ring 3 is reset in H of FIG. 19.

Moreover, in J of FIG. 19, a network I/F card of the bridge device 1-1, which is connected to the ring 1, is reset. However, since the bridge device 1-1 continues operating as a partial master in the ring 4, determination in step S173 is YES in the processing shown in FIG. 17 according to the resetting. Therefore, an additional OM command is not generated, and the system state is stabilized in K of FIG. 19. In addition, the bridge device 1-1 temporarily stops transmission of an audio signal through the bridge device until the ring 1 can be reconstructed in K of FIG. 19 after the ring 1 is disassembled in J of FIG. 19.

As described above, even if the word clock source of the entire system is changed to the device 2-2 located in the completely different ring until then, the transmission direction of a word clock timing through a bridge device is appropriately changed in response to this so that the word clock timing can be appropriately transmitted to all devices in the system and both transmission of an audio signal in a ring and transmission of an audio signal through the bridge device can be continued in the same manner as before the word clock source is changed. Undoubtedly, signal processing according to a word clock in each device can be similarly continued.

4. Modifications

While the embodiment has been described, it is needless to say that the configuration of a device, the connection topology of a system, the procedure of a user's operation, specific processing content, and the like are not limited to those described in the above embodiment.

For example, the connection of partial networks in the audio network system is not limited to series connection shown in FIGS. 18 to 19 and may be a connection in which three or more bridge devices are present in one partial network and branch into three or more directions from the corresponding partial network.

Figure 20:
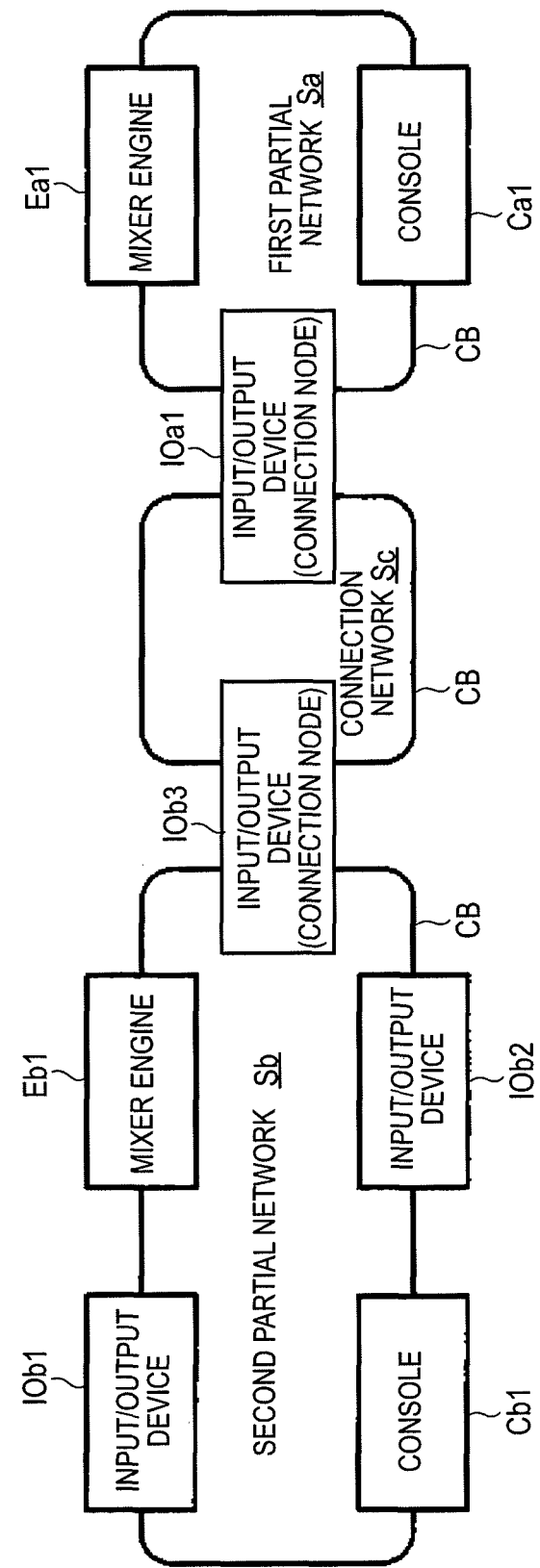
FIG. 20 is a view showing the configuration of an audio network system used to explain a modification.

In addition, a plurality of audio processing systems may be formed in one audio network system, as proposed in Japanese Patent Application 2009-223613 which is related application of this applicant. In this related application, an example is shown in which a first mixer system MSa (FIG. 22) controlled by a console Ca1 and a second mixer system MSb (FIG. 23) controlled by a console Cb1 are formed on an audio network system which is formed by connecting devices as shown in FIG. 20 and in which each device reads and writes an audio signal from and into a TL frame of each ring (band shown for each partial network indicates a signal transmission channel that each device ensures in the partial network) as shown in FIG. 21.

The control range of the console Ca1 of the first mixer system MSa is the console Ca1, an input/output device IOa1, and an engine Ea1 belonging to the same partial network. However, the engine Ea1 may have not only audio signals input to the console Ca1, the input/output device IOa1, and the engine Ea1 but also (some) audio signals from the console Cb1 and input/output devices IOb1, IOb2, and IOb3, which are supplied through the input/output device IOa1 that is a bridge device, as input signals to be mixed.

Similarly, the control range of the console Cb1 of the second mixer system MSb is the console Cb1, the input/output devices IOb1, IOb2, and IOb3, and an engine Eb1 belonging to the same partial network. However, the engine Eb1 may have not only audio signals input to the console Cb1, the input/output devices IOb1, IOb2, and IOb3, and the engine Eb1 but also (some) audio signals from the engine Ea1, which are supplied through the input/output device IOb3 that is a bridge device, as input signals to be mixed.

Here, the reason why "some" is supplemented is that audio signals transmitted through the input/output devices IOa1 and IOb3 are not all audio signals of partial networks Sa and Sb but some audio signals set to be transmitted.

Moreover, similar to the examples shown in FIGS. 20 to 23, for example, in a system with the connection topology shown in FIG. 18, it is possible to built a first audio signal processing system with the five devices 1-1 to 1-5 belonging to the ring 1 and to built a second audio signal processing system with the three devices 2-1 to 2-3 belonging to the ring 2. In this case, in the first audio signal processing system, not only audio signals directly input to the first audio signal processing system but also (some) audio signals of the device 4-1 supplied through the bridge device 1-1 or (some) audio signals of the devices 2-1 to 2-3 and 3-1 supplied through the bridge device 1-3 can be processed. In addition, in the second audio signal processing system, not only audio signals directly input to the second audio signal processing system but also (some) audio signals of the devices 1-1 to 1-5, 3-1, and 4-1 supplied through the bridge device 2-1 can be processed.

For example, even if a word clock source is changed in the first audio signal processing system (B of FIG. 18) in this state, the second audio signal processing system can continue audio signal processing as an independent audio signal processing system without being influenced by the change except for a point that an audio signal is no longer supplied through the bridge device 1-3.

Moreover, not only those described in the above embodiment but also the modifications described above may be arbitrarily combined and applied within the range which is not contradictory. In addition, the network system does not necessarily have all the features described in the embodiment.

As is apparent from the above description, according to the audio signal processor and the audio signal processing system of the invention, even when a system is made to have a configuration in which a plurality of transmission paths are connected to each other in the case of transmitting a timing of a sampling clock by a frame which circulates between devices included in the system, a transmission-impossible time in each transmission path caused by changing a clock source to a device of a different transmission path can be shortened.

Therefore, convenience of the audio signal processing system can be improved by applying the invention.

What is claimed is:

1. An audio bridge device connected to a first network an a second network, in each network, one of audio devices including the audio bridge device operates as a master node and the other audio devices operate as slave nodes, the audio bridge device operates as a master node in at least one of the first and second networks, the master node in a network generates and transmits to the network an audio transmission frame conveying audio signals every sampling period, the audio transmission frame passes through all devices included in the network and returns to the master node, one of the devices in the network writes an audio signal into the audio transmission frame, and another one of the devices reads the audio signal from the audio transmission frame such that the audio signal is transmitted from the one device to the other device, the audio bridge device comprising:

a first interface connected to the first network;
a second interface connected to the second network;
a clock generator that periodically generates a sampling clock;
a frame generator, operable when the audio bridge device operates as the master node of a network, that generates the audio transmission frame, to be transmitted to the network, synchronously with the sampling clock;
a clock controller that, in a state where the audio bridge device operates as a slave node in the first network connected by the first interface and operates as a master node in the second network connected by the second interface, controls the clock generator to generate the sampling clock synchronously with a receiving timing of the audio transmission frame while the audio transmission frame is periodically received in the first network, otherwise to generate the sampling clock at its own timing; and
a operation switcher that, in a state where the audio bridge device operates as a slave node in the first network connected by the first interface and operates as a master node in the second network connected by the second interface, controls the audio bridge device to start an operation as a slave in the second network when another node in the second network resets the second network and starts to operate as a master node in the second network, thereafter when periodic reception of an audio transmission frame generated and transmitted by the other node as the master node in the second network is started, resets the first network and controls the audio bridge device to start an operation as a master node in the first network.

2. The audio bridge device according to claim 1, further comprising a forwarding section operable on condition that periodical transmission and reception of an audio transmission frame in the first network by the first interface and periodical transmission and reception of an audio transmission frame in the second network by the second interface synchronize with each other, that writes an audio signal, read from an audio transmission frame in the first network, into an audio transmission frame in the second network, and/or writes an audio signal, read from an audio transmission frame in the second network, into an audio transmission frame in the first network, thereby the audio signal is forwarded from the first network to the second network by the audio bridge device and/or the audio signal is forwarded from the second network to the first network by the audio bridge device.

3. An audio signal processing system comprising:

a first network formed by connecting one or more first devices and a bridge device by cables, in which one of the first devices and the bridge device operates as a master node and other devices operate as slave nodes;
a second network formed by connecting one or more second devices and the bridge device by cables, in which one of the second devices and the bridge device operate as a master node and the other devices operate as slave nodes; wherein each of the first devices, the second devices, and the bridge devices comprises a clock generator which generates a sampling clock every sampling period,
in each network of the first network and the second network, one device operates as a master node periodically generates and transmits to the network an audio transmission frame synchronously with the sampling clock generated by the clock generator in the master node, the audio transmission frame passes through all devices included in the network and returns to the master node, one of the devices in the network writes an audio signal into the audio transmission frame, and another one of the devices reads the audio signal from the audio transmission frame such that the audio signal is transmitted from the one device to the other device, characterized in that the bridge device includes;
a clock controller that, in a state where the bridge device operates as a slave node in the first network and operates as a master node in the second network, controls the clock generator to generate the sampling clock synchronously with a receiving timing of an audio transmission frame while the audio transmission frame is periodically received in the first network, otherwise to generate a sampling clock at its own timing,
a operation switcher that, in a state where the bridge device operates as a slave node in the first network and operates as a master node in the second network, controls the audio bridge device to start an operation as a slave in the second network when another node in the second network resets the second network and starts to operate as a master node, thereafter when periodic reception of an audio transmission frame generated and transmitted by the other device as the master node in the second network is started, resets the first network and controls the bridge device to start an operation as a master node in the first network.

4. The signal processing system according to claim 3, wherein each of the first devices and the second devices includes a clock controller that controls the clock generator to generate the sampling clock synchronously with a receiving timing of an audio transmission frame when the device operates as a slave node, and to generate the sampling clock at its own timing when the device operates as a master node.

5. The signal processing system according to claim 3, wherein each of the first devices and the second devices execute signal processing on audio signals synchronously with the sampling clock generated by the clock generator in the device.

6. The signal processing system according to claim 3, wherein the first network includes a second bridge device, and the audio processing system further comprising a third network formed by connecting one or more third devices and the second bridge device by cables, in which one of the third devices and the second bridge device operate as a master node and other devices operate as slave nodes, and the second bridge in the first network and the third network operate in the same way as the bridge device in the first network and in the second network.

7. The signal processing system according to claim 3, wherein the second network including a third bridge device, and the audio signal processing system further comprising a fourth network formed by connecting one or more fourth devices and the third bridge device by cables, in which one of the fourth devices and the third bridge device operates as a master node and other devices operate as slave nodes, and the third bridge in the second network and the fourth network operate in the same way as the bridge device in the first network and the second network.

* * * * *